US010932343B2

(12) United States Patent
Reed et al.

(10) Patent No.: US 10,932,343 B2
(45) Date of Patent: Feb. 23, 2021

(54) SWITCH PROTECTION APPARATUS AND OPERATING METHOD THEREOF

(71) Applicant: EXPRESS IMAGING SYSTEMS, LLC, Renton, WA (US)

(72) Inventors: William G. Reed, Seattle, WA (US); Dale H. DeGraff, Brier, WA (US); Richard Dolf, Seattle, WA (US); Donald Arthur Vendetti, Seattle, WA (US)

(73) Assignee: EXPRESS IMAGING SYSTEMS, LLC, Renton, WA (US)

( * ) Notice: Subject to any disclaimer, the term of this patent is extended or adjusted under 35 U.S.C. 154(b) by 0 days.

(21) Appl. No.: 16/408,875

(22) Filed: May 10, 2019

(65) Prior Publication Data

US 2020/0045794 A1 Feb. 6, 2020

Related U.S. Application Data

(60) Provisional application No. 62/669,883, filed on May 10, 2018.

(51) Int. Cl.
*H05B 47/24* (2020.01)
*H05B 47/10* (2020.01)
(Continued)

(52) U.S. Cl.
CPC ............ *H05B 47/11* (2020.01); *G01J 1/0271* (2013.01); *H01H 9/54* (2013.01); *H02H 3/04* (2013.01);
(Continued)

(58) Field of Classification Search
CPC ...... H05B 47/11; H05B 45/395; H05B 45/50; H05B 45/10; G01J 1/0271; H01H 9/54; H02H 3/04; H02H 3/08
See application file for complete search history.

(56) References Cited

U.S. PATENT DOCUMENTS 5,508,589 A * 4/1996 Archdekin ............. H05B 41/40
315/149
5,619,127 A * 4/1997 Warizaya .................. G05F 5/00
323/275

(Continued)

FOREIGN PATENT DOCUMENTS

WO 2013028834 A1 2/2013

*Primary Examiner* — Henry Luong
(74) *Attorney, Agent, or Firm* — Cozen O'Connor

(57) ABSTRACT

A protection system and operating method thereof promotes the longevity of components of a control subsystem. The protection apparatus may include a first connector for connecting to the control system and a second connector for connecting to a target system. The protection apparatus detects states of a component of the control subsystem over time and causes a state transition of a switching circuit of the protection apparatus based on the detected states of the control subsystem. The state transition of the switching circuit of the protection system may be initiated after a defined period of time has elapsed after detecting states of the control subsystem component. The state transition of the switching circuit may be a transition between an open state in which power is not provided to a node of the second connector and a closed state in which power is provided to the node of the second connector.

23 Claims, 15 Drawing Sheets

(51) Int. Cl.
  *H05B 47/105*   (2020.01)
  *H05B 47/11*   (2020.01)
  *H01H 9/54*   (2006.01)
  *G01J 1/02*   (2006.01)
  *H02H 3/04*   (2006.01)
  *H02H 3/08*   (2006.01)
  *H05B 45/10*   (2020.01)
  *H05B 45/50*   (2020.01)
  *H05B 45/395*   (2020.01)

(52) U.S. Cl.
  CPC ............... *H02H 3/08* (2013.01); *H05B 45/10* (2020.01); *H05B 45/395* (2020.01); *H05B 45/50* (2020.01)

(56) References Cited

U.S. PATENT DOCUMENTS

| | | | |
|---|---|---|---|
| 7,084,587 B2* | 8/2006 | Archdekin | H05B 41/382 |
| | | | 315/309 |
| 10,219,360 B2 | 2/2019 | Vendetti et al. | |
| 10,390,414 B2 | 8/2019 | Vendetti et al. | |
| 2007/0217093 A1* | 9/2007 | Xue | H05B 41/2853 |
| | | | 361/18 |
| 2013/0043792 A1 | 2/2013 | Reed | |
| 2013/0163243 A1 | 6/2013 | Reed | |
| 2013/0307418 A1 | 11/2013 | Reed | |
| 2013/0313982 A1 | 11/2013 | Reed | |
| 2014/0028198 A1 | 1/2014 | Reed et al. | |
| 2014/0159585 A1 | 6/2014 | Reed | |
| 2014/0225521 A1 | 8/2014 | Reed | |
| 2014/0320027 A1 | 10/2014 | Reed | |
| 2015/0028693 A1 | 1/2015 | Reed | |
| 2015/0077019 A1 | 3/2015 | Reed et al. | |
| 2015/0084520 A1 | 3/2015 | Reed | |
| 2016/0021713 A1 | 1/2016 | Reed | |
| 2016/0037605 A1 | 2/2016 | Reed et al. | |
| 2016/0286623 A1 | 9/2016 | Reed | |
| 2016/0323955 A1 | 11/2016 | Reed | |
| 2017/0311424 A1* | 10/2017 | Vendetti | H05B 45/10 |
| 2018/0083438 A1 | 3/2018 | Reed | |
| 2018/0083539 A1 | 3/2018 | Reed | |
| 2018/0288860 A1 | 10/2018 | Vendetti et al. | |
| 2018/0338367 A1 | 11/2018 | Reed | |
| 2019/0394862 A1 | 12/2019 | Vendetti et al. | |
| 2020/0029404 A1 | 1/2020 | Reed | |
| 2020/0045794 A1 | 2/2020 | Reed et al. | |

* cited by examiner

SWITCH PROTECTION APPARATUS AND OPERATING METHOD THEREOF

BACKGROUND

Technical Field

The present disclosure relates to the field of automated device control and, more particularly, to the control of power provisioning to illumination devices.

Description of the Related Art

Conserving energy is an important consideration to many persons and organizations. To that end, technologies have been developed to facilitate the automatically or remotely powering devices on and off based on environmental and/or temporal conditions. In one application, illumination interior or exterior spaces may be controlled based on the level of ambient light detected. Light sources of street lamps, for instance, may be powered on or off based on detection of the level of ambient light outside.

Disrepair of illumination devices and other automatically controlled devices implementing automatic or remote power control is in at least some instances traceable to the use of an electromechanical switch controlling power to such devices. Contact arching, pivot bearing deterioration, and/or power line voltage surging may contribute to the wear of electromechanical switches over time. When the electromechanical switches finally fail or otherwise impair operation of the overall device, manual repair or replacement by a technician is often required. Physical access to at least some components of these illumination devices is difficult due to the height or location of illumination devices high on lighting poles, building walls, or within an assembly. As a result, the cost, in terms of man hours, efficiency, and resources required, of diagnosing and performing maintenance to replace or repair illumination devices can be relatively high.

BRIEF SUMMARY

A protection apparatus selectively attachable to a control apparatus and a device to be at least partially controlled by the control apparatus, the control apparatus having a connector with a set of electrical contacts and at least one switch, the device having a set of nodes, may be summarized as including: a housing; a first connector accessible from an exterior of the housing, the first connector including a first set of electrical contacts that interface with corresponding ones of the set of electrical contacts of the connector of the control apparatus; a second connector accessible from the exterior of the housing, the second connector including a second set of electrical contacts that interface the protection apparatus with corresponding ones of the nodes of the device to be at least partially controlled by the control apparatus; and circuitry included on one or more printed circuit boards contained within the housing, the circuitry electrically coupled to one or more of the first set of electrical contacts and one or more of the second set of electrical contacts, wherein the circuitry: selectively switches between a first state and a second state, the first state in which a closed circuit is established between a first electrical contact of the first set of electrical contacts and a node of the protection apparatus electrically coupled to at least one of the second set of electrical contacts, and second state in which an open circuit is established between the first electrical contact and the node, detects a transition of the switch of the control apparatus from a third state in which the switch is open to a fourth state in which the switch is closed, and transitions between the first state and the second state in response to a determination that the switch is in a steady state after detection of the transition of the switch from the third state to the fourth state.

The determination that the switch is in the steady state may include a determination that a defined period of time has elapsed since the detection of the switch event. The second connector may be a twist-lock plug and the second set of electrical contacts may be male connector contacts. The second set of connector elements may include a set of wires to establish electrical connections with the corresponding nodes of the device to be at least partially controlled by the control apparatus. The circuitry may include a bi-directional alternating current switch comprising one or more solid state switches, and the bi-directional alternating current switch may switch between the first state and the second state. The circuitry may include a TRIAC (triode for alternating current), and the TRIAC may switch between the first state and the second state. The circuitry may include two enhancement mode N-channel MOSFETS connected in series as an AC switch. The circuitry may include inrush current limiting circuitry electrically coupled between an input terminal of the circuitry and an output terminal of the circuitry, the inrush current limiting circuitry providing a constraint on an inrush of current to the first connector element caused by a transition of the circuitry between the first state and the second state.

Mechanical relays are subject to contact erosion and contact welding when high inrush currents are present during contact closing because of an initial arc and further arcing due to contact bounce. LED luminaires may experience have relatively high inrush currents when power is applied by the relay contacts, which is due to capacitance in the LED drive circuitry. The present disclosure detects the closing of the relay contacts, but retains the bi-directional AC switch in the non-conducting state until the relay contacts have fully settled closed. When the relay contacts are stably closed, the bi-directional AC switch is operated to apply power to the luminaire, allowing any inrush current to pass through the relay without arcing, thereby helping to reduce or eliminate contact erosion or arcing.

The first connector may be a twist-lock receptacle that includes female receptacles for receiving corresponding male connector contacts of the connector of the control apparatus. The circuitry may further determine a set of states of the switch of the control apparatus over a period of time and may further determine a status of the control apparatus based at least in part on a number of switching events of the switch over the period of time. The circuitry may have a normal mode in which selective provisioning of power received at the second connector is controlled by the control apparatus and a failure detection mode in which selective provisioning of the power received at the second connector is controlled by a failsafe module. The failsafe module may transition between the normal mode and the failure detection mode based at least in part on a status of the control apparatus. In this context, failure detection mode means that the power may be applied and removed from the load (e.g., the lighting subsystem) by the failsafe module controlling operation of the semiconductor switch.

The protection apparatus may further include a communication interface to communicate the status of the control apparatus to one or more devices external to the protection apparatus.

The status of the control apparatus may be determined based at least in part on location information indicating a location of the protection apparatus. The status of the control apparatus may be determined based at least in part on meteorological or atmospheric data regarding conditions local to the protection apparatus.

The protection apparatus may further include a photosensor electrically coupled to the circuitry, wherein the status of the control apparatus may be determined based at least in part on one or more measurements obtained from the photosensor.

The protection apparatus may further include a communication interface to communicate with one or more devices external to the protection apparatus, wherein the circuitry may have a normal mode in which selective provisioning of power received at the second connector is controlled by the control apparatus and a failure detection mode in which selective provisioning of the power received at the second connector is controlled by the circuitry, and the circuitry may operate in the normal mode or the failure detection mode based at least in part on a communication received by the communication interface.

The first connector may include a third set of electrical contacts for interfacing with a second set of corresponding electrical contacts of the control apparatus. The second connector may include a fourth set of electrical contacts, and the third set of electrical contacts may be electrically coupled to the fourth set of electrical contacts. The housing may have a cylindrical shape, the first connector located on a first side of the housing, and the second connector located on a second side of the housing opposite to the first side. The housing may be sized and shaped to be at least partially positioned within the device to be at least partially controlled by the control apparatus.

A system may be summarized as including: a lighting subsystem including one or more light sources; a control subsystem having an electromechanical switch that transitions between an open state and a closed state; a protection apparatus connecting the lighting subsystem with the control subsystem, the protection apparatus including: a housing positioned in between the lighting subsystem and the control subsystem; a first connection with a set of electrical contacts of the control subsystem; a second connection with a set of electrical contacts of the lighting subsystem, and one or more printed circuit boards installed within the housing and including circuitry that: detects a switching event of the electromechanical switch of the control subsystem from the open state to the closed state, and selectively switches, in response to determining that the switch is in a steady state after not detecting a switch event over a period of time (e.g., 24 hours), from a first state in which an open circuit is established between the one or more light sources and the electromechanical switch and a second state in which a closed circuit is established between the one or more light sources and the electromechanical switch.

Mains power may be connected to the system, the mains power may not be supplied to the light sources in the first state, and the mains power may be supplied to the light sources in the second state. The protection apparatus may be removably attachable with at least one of the control subsystem and the lighting subsystem. A method of protecting an electromechanical switch of a control apparatus removably attached to a protection apparatus may be summarized as including: detecting a transition of the electromechanical switch from a first state in which the electromechanical switch is open to a second state in which the switch is closed; in response to detecting the transition, causing a time delay of a defined period of time to elapse; and as a result of determining that a defined period of time has elapsed since detecting the transition, causing an alternating current switch to establish a closed circuit from one electrical contact of the protection apparatus, through the electromechanical switch, and to a second electrical contact of the protection apparatus.

The protection apparatus may be connected to a device to be controlled by the control apparatus, mains power may be supplied to the device as a result of the closed circuit being established, and the mains power may not be supplied to the device as a result of the open circuit being established.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with lighting systems, for example power converters, thermal management structures and subsystems, and/or solid state lights have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
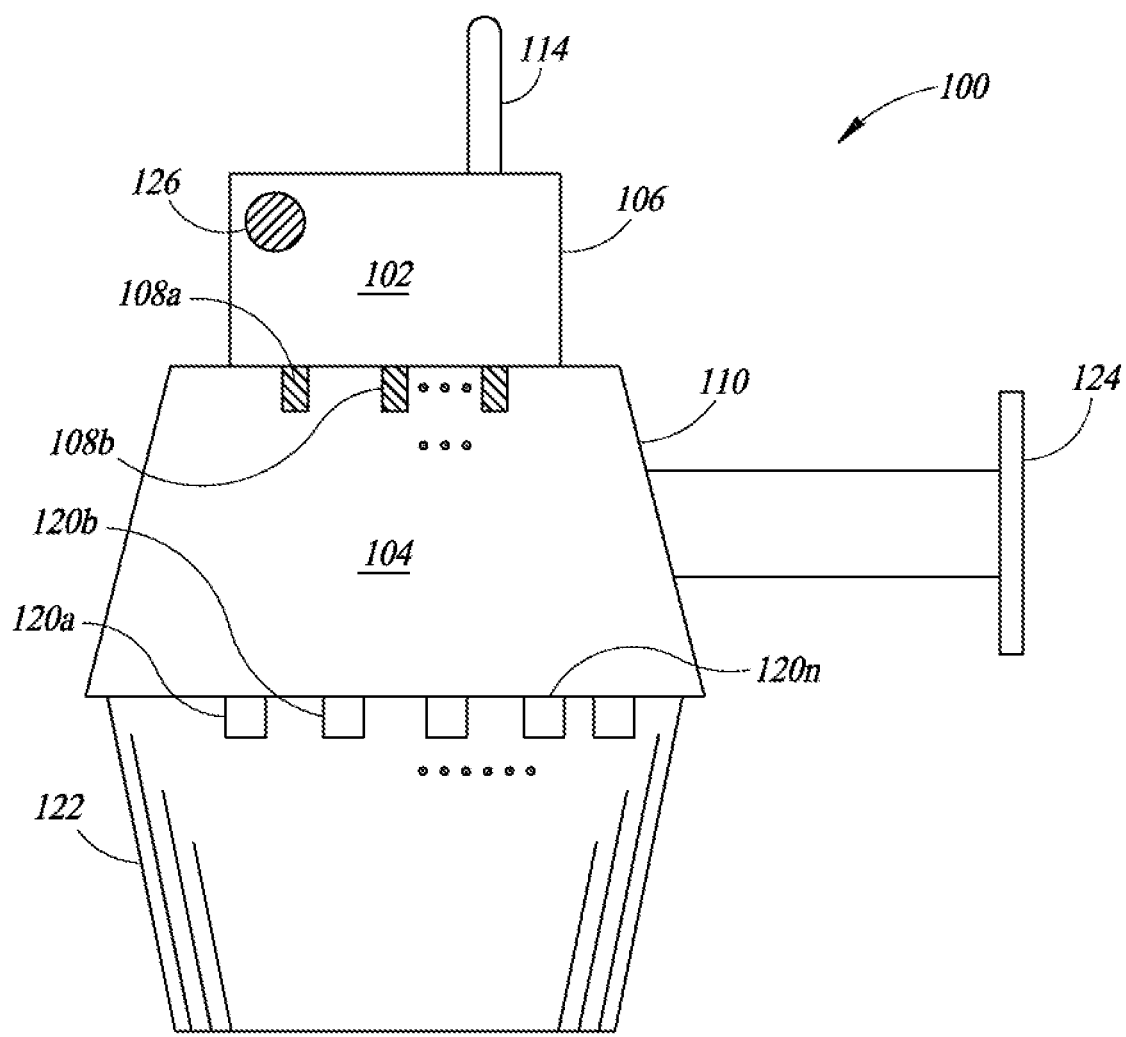
FIG. 1 is an isometric diagram showing a luminaire including a control subsystem and a light source.

FIG. 1 illustrates a luminaire 100 including a control subsystem 102 disposed within a housing 106 that is physically and electrically coupled to a lighting subsystem 104 via one or more connector elements 108a-b (collectively 108). The lighting subsystem 104 can be at least partially disposed in a luminaire housing 110. One or more solid-state light sources 120a-n (collectively light source or light sources 120) can be partially or completely surrounded by the luminaire housing 110. In at least some instances, all or a portion light provided by the one or more light sources 120 may pass through a cover 122 (e.g., lens, diffuser or similar shade) attached to the luminaire housing 110 when exiting the luminaire 100.

The control subsystem 102 may have one or more features that enable automatic control of the illumination of the light sources 120. Automatic control of the illumination of the light sources 120 includes causing the light sources 120 to turn on or off in response to one or more conditions. In one embodiment, the control subsystem 102 may include a photosensitive transducer 126 useable to obtain an ambient light level measurement. The control subsystem 102 may selectively provide power to the light sources 120 in response to the ambient light level measurement obtained by the transducer 126 being less than a threshold, and selectively stop provisioning of power to the light sources 120 in response to the ambient light level measurement being equal to or exceeding the threshold.

Although the control subsystem 102 and the lighting subsystem 104 are depicted as physically attached using a plug type electrical coupling connector element 108 in FIG. 1, at times the control subsystem 102 may be disposed in a location remote from the lighting subsystem 104, or may be integrated therewith. For example, in some embodiments the control subsystem 102 may be at least partially disposed within a housing 106 that is mounted on an exterior surface of a structure and the lighting subsystem 104 may be mounted inside the structure. When the control subsystem 102 is remotely mounted, one or more wired or wireless connections may be used to power the control subsystem 102 and to communicably couple the control subsystem 102 with the lighting subsystem 104. The photosensitive transducer 126 may be physically associated with the control subsystem 102, the lighting subsystem 104, neither subsystem, or both subsystems. The luminaire 100 can include one or more brackets 124 that permit the luminaire 100 to be suspended from or otherwise supported by a rigid structure such as that provided by a pole or building. The cover 122 may include a light transmissive portion (e.g., transparent or translucent) that lets at least some light pass therethrough. For example, the cover 122 may include a diffuser portion formed from a light transmissive plastic material. The cover 122 may also include an opaque portion.

The luminaire 100 may include wiring (not shown in FIG. 1) to supply power to the control subsystem 102 and the lighting subsystem 104 using an external electrical power source such as an electrical power grid. In some instances, the one or more light sources 120 may be formed into a replaceable component, for example a plurality of individual solid-state light sources or solid-state light source strings formed into a bulb or similar unitary structure that physically attaches and electrically couples to the lighting subsystem 104 using a threaded, plug, or bayonet-type socket mount. Alternatively, the one or more light sources 120 may be integral with the lighting subsystem 104, particularly where the lighting subsystem 104 includes a plurality of solid-state light emitters and associated driver circuit hardware which have a relatively long operational life.

The control subsystem 102 includes electrical circuitry or electronics that control or otherwise alter or adjust the power, luminosity, luminous output, or illumination state of the lighting subsystem 104, or control one or more functions of the luminaire 100. Such functions may include, but are not limited to adjusting or otherwise controlling the luminous output of the one or more light sources 120 in response to detected or expected ambient light levels.

The housing 106 can include any structure suitable for internally and/or externally accommodating all or a portion of the control subsystem 102. At times, the housing may be a metallic weatherproof enclosure (e.g., a National Electrical Manufacturers Association "NEMA" type 3, 3R, or 4 enclosure) or a corrosion resistant weatherproof enclosure (e.g., a NEMA 4× enclosure). At least a portion of the housing 106 may be substantially transparent to radio frequency (RF) or optical electromagnetic radiation. The housing 106 may include one or more features, such as one or more threaded fasteners, plugs, hooks and loops, or combinations thereof to facilitate the mechanical or physical attachment of the housing 106 to the luminaire housing 110 or other structure. In some instances, the electrical coupling connector element 108 can include a number of electrical contacts such as pads, prongs, spades, protrusions, or similar electrically conductive structures on at least a portion of the exterior surface of the housing 106. Such surface mount electrical connectors are particularly advantageous where the control subsystem 102 is fitted directly to the luminaire housing 110 during manufacture or where the control subsystem 102 is retrofitted to an existing luminaire housing 110 after installation. In other instances, the electrical coupling connector element 108 can include a number of cables, each having a number of conductors extending from the housing 106. Such remote mount electrical connectors are particularly useful where the control subsystem 102 is mounted in the field at a distance from the luminaire housing 110. In some instances, the control subsystem 102 and the lighting subsystem 104 are formed together in a single housing.

The control subsystem 102 may be attached to the lighting subsystem 104 via engagement of connector elements 108a of the control subsystem 102 with connector elements 108b of the lighting subsystem 104. In one embodiment, the connector elements 108a are male connector elements and the connector elements 108b are female connector elements for receiving the connector elements 108a. In one embodiment, the connector elements 108b are male connector elements and the connector elements 108a are female connector elements for receiving the connector elements 108b. The connector elements 108 may be designed according to one or more connector standards, such as standards defined by the National Electrical Manufacturers Association (hereinafter "NEMA") and the American National Standards Institute (hereinafter "ANSI"). Standards include twist-locking connector standards NEMA L5, L6, L7, L8, L9, L14, L15, L16, L7, L18, L21, L22, and L23; and ANSI C136 Engagement of the connector elements 108b with the connector elements 108a establishes at least an electrical connection between one or more components of the lighting subsystem 104 with one or more components of the control subsystem 102. In at least some embodiments the electrical connection between the lighting subsystem 104 and the control subsystem 102 may be established by connecting one or more wires of the control subsystem 102 with one or more corresponding electrical contacts of the lighting subsystem 104.

The one or more light sources 120 may take a variety of forms. The light source 120 may include one or more distinct light bulbs, lights or light emitters 120a-120n (only four called out in FIG. 1). For example, the one or more light sources 120 may take the form of one or more solid-state light sources, for instance an array of light emitting diodes (LEDs), organic light emitting diodes (OLEDs), or polymer light emitting diodes (PLEDs). The one or more light sources 120 do not necessarily have to be enclosed in a bulb structure. For example, the light sources may take the form of one-, two-, or even three-dimensional arrays of individual LEDs or strings of LEDs.

Light source configurations other than the individual luminaire shown in FIG. 1 may be used to equal effect. For example, the luminaire may include a plurality of directional light sources 120 mounted on a common base and operated using a common control subsystem 102. In another example, a plurality of luminaires 100 may be networked (i.e., communicably coupled) together and the luminous output of each of luminaires 100 in the network controlled as a group using a single control subsystem 102.

The photosensitive transducer 126 may be used to detect via ambient light measurement the occurrence of one or more solar events including a detected dawn event and a detected dusk event used to control the luminous output of the lighting subsystem 104. In at least some instances, the time of occurrence of various solar events (e.g., a sunrise event, a sunset event, a dusk event, a dawn event) can be determined using one or more lookup tables or other data structures containing data indicative of the times of occurrence for various solar events and stored in a non-transitory storage media accessible by the control subsystem 102. The time of occurrence of various solar events may additionally or alternatively be calculated using geolocation, time, or date data either generated by or stored within the protection apparatus 200 or obtained from one or more external devices via one or more wired or wireless communication interfaces either in or communicably coupled to the protection apparatus 200 In at least some embodiments, an electrical switching element, such as a relay, is operable to selectively control illumination of the light sources 120 when the control subsystem 102 is attached to the lighting subsystem 104 based at least in part on the ambient light measurements. As described below, the electrical switching element may transition between a closed state, in which the light sources 120 are illuminated, and an open state, in which the light sources 120 are not illuminated, based on the ambient light measurements. The ambient light measurements may correspond to an electrical signal provided by one or more photosensitive electrical elements of a photo-control element 516 of the control subsystem 102. Examples of the photo-control element 516 include phototransistors, photodiodes, photoresistors, and opto-couplers.

The photocontrol may be removed and replaced with a network radio module to allow control of the luminaire to be assumed by a central control computer. In this case, the relay in the radio module will be protected by the protection apparatus 200 in a manner similar to the way that the relay of a control subsystem 102 with photosensor-based control was protected.

Figure 2:
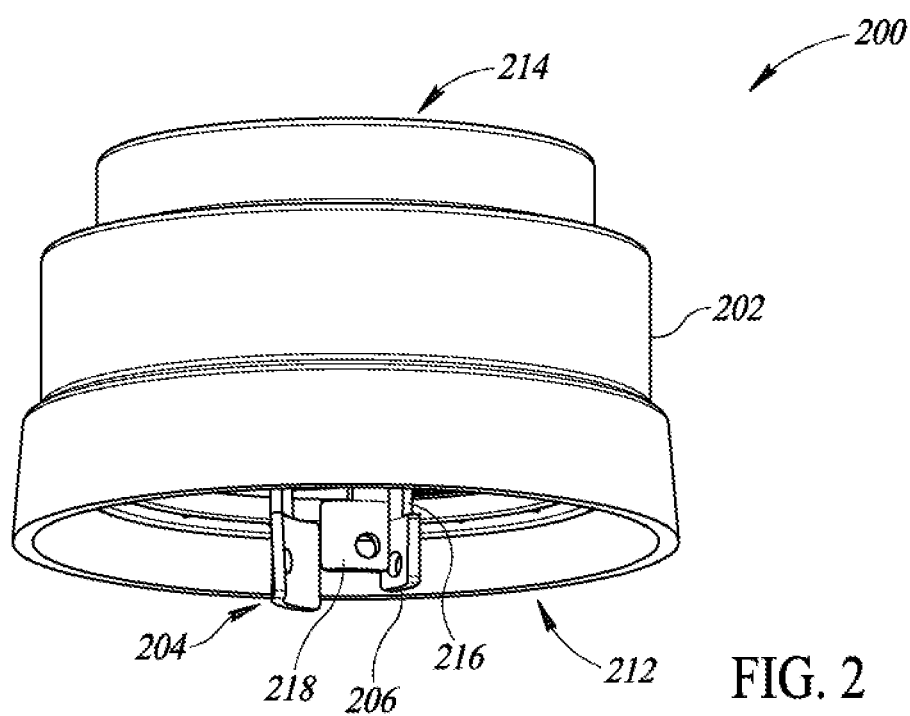
FIG. 2 is a first perspective view of an assembly of a protection apparatus.
Figure 3:
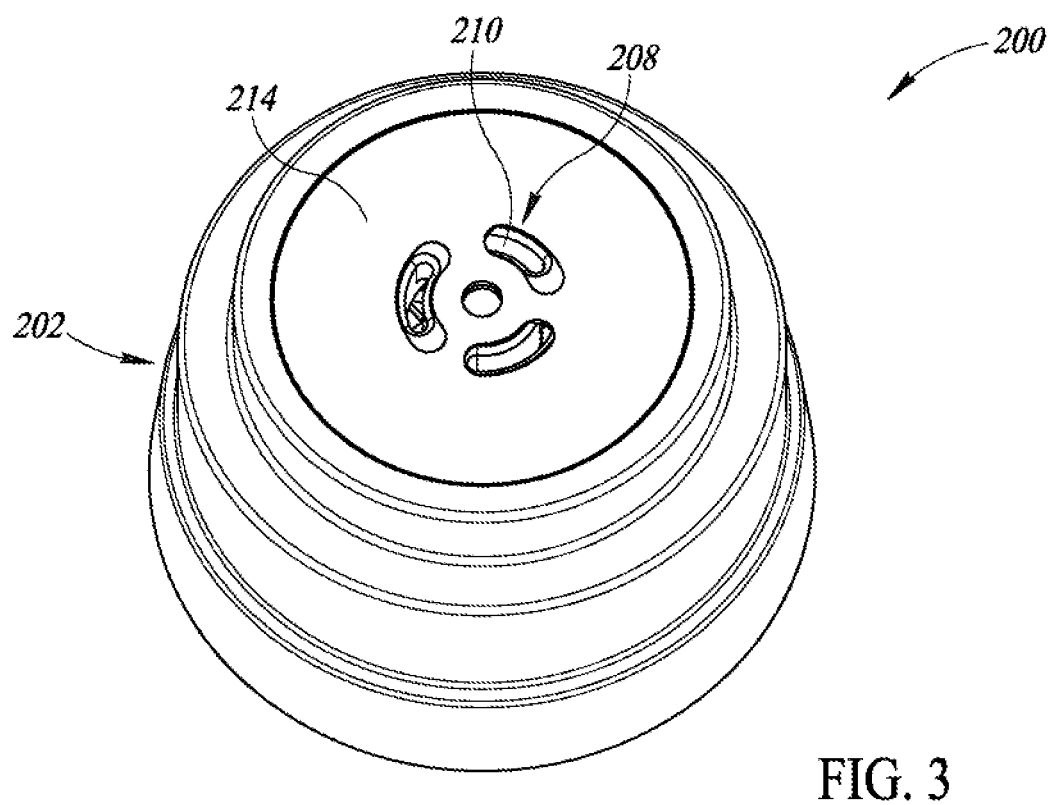
FIG. 3 is a second perspective view of the assembly of the protection apparatus of FIG. 2.

FIGS. 2 and 3 show an electrical protection apparatus 200 for providing electrical protection to one or more components of a subsystem attached thereto. The protection apparatus 200 includes a housing 202 having cylindrical sidewalls and containing electrical components for protecting an attached subsystem, and including one or more connectors for attaching to other subsystems. In some embodiments, the housing 202 may have a circular cross-sectional shape. In some embodiments, the housing 202 may have a cylindrical shape with an upper surface, a lower surface in a parallel relationship to the upper surface, and curved sidewalls extending between the upper surface and the lower surface. In some embodiments, the housing 202 may have a puck-like shape wherein the thickness of the housing 202 is small relative to its width.

In one embodiment, the subsystem 200 includes a first connector 204 comprising a set of electrical male connectors 206 is provided at a first side 212 of the housing 202, as shown in FIG. 2. A second connector 208 comprising a set of electrical female connectors 210 is provided at a second side 214 of the housing 202 opposite to the first side 212.

The first connector 204 is provided for selectively connecting the protection apparatus 200 to an illumination device, such as the lighting subsystem 104 of FIG. 1. In some embodiments, the first connector 204 comprises a set of male connector elements 206 for establishing a connection to corresponding female connector elements of the illumination device. In at least some of those embodiments, the male connector elements 206 are concentrically arranged on the first side 212 of the housing 202.

The male connector elements 206 of the first connector 204 may be sized and shaped for securely inserting into the connector elements 108b of the lighting subsystem 104. The male connector elements 206 are electrically conductive elements that are connected to electrical elements within the housing 202. The male connector elements 206 may each have a shank portion 216 extending from the first side 212 and ending in a body portion 218 having a dimension wider than the shank portion 216. With the male connector elements 206 inserted into the lighting subsystem connector elements 108b, the protection apparatus 200 may be rotated to engage the body portions 218 of the male connector elements 206 with a corresponding opposing surface within the lighting subsystem connector elements 108b, thereby creating a secure attachment between the lighting subsystem 104 and the protection apparatus 200. The secure attachment may create a secure mechanical attachment as well as one or more electrical connections between the connector of the lighting subsystem 104 and the first connector 204 of the protection apparatus 200. In at least some embodiments, the male connector elements 206 are designed according to one or more ANSI C136 standards, such as ANSI C136.41-2013. In some embodiments, however, the housing 202 may have an interface other than the first connector 204 for establishing an electrical and/or mechanical connection with the illumination device, as described below in greater detail.

The second connector 208 is provided for selectively connecting the protection apparatus 200 to a control device, such as the control subsystem 102 of FIG. 1. In some embodiments, the second connector 208 on the second side 214 of the housing 202 includes female connector elements 210 for establishing a connection to corresponding male connector elements of the control device. In at least some of those embodiments, the female connector elements 210 are concentrically arranged on the second side 214 of the housing 202.

The female connector elements 210 of the second connector 208 are sized and shaped for securely receiving the connector elements 108a of the control subsystem 102. The female connector elements 210 may be used to guide each male connector element 108a toward an electrical contact within the housing 202. Once inserted into the female connector elements 210, the male connector elements 108a may be rotated clockwise and/or counter-clockwise to securely lock the male electrical contacts 108a with the female connector elements 210. In some implementations, as discussed below for example, the male connector elements 108a may be part of a turn-lock plug in which the male electrical contacts have a distal end that includes an offset portion that can be inserted fully into the corresponding female connector elements 210. When turned, the offset portion of the male connector elements may engage with a corresponding edge or lip within each respective female connector elements 210 that hold the distal end within the respective female connector elements to create a selectively secure mechanical connection. When locked within the female connector elements 210, the male connector elements 108a may be maintained in contact, and thereby be electrically coupled, with the electrical elements within the housing 202.

Figure 4:
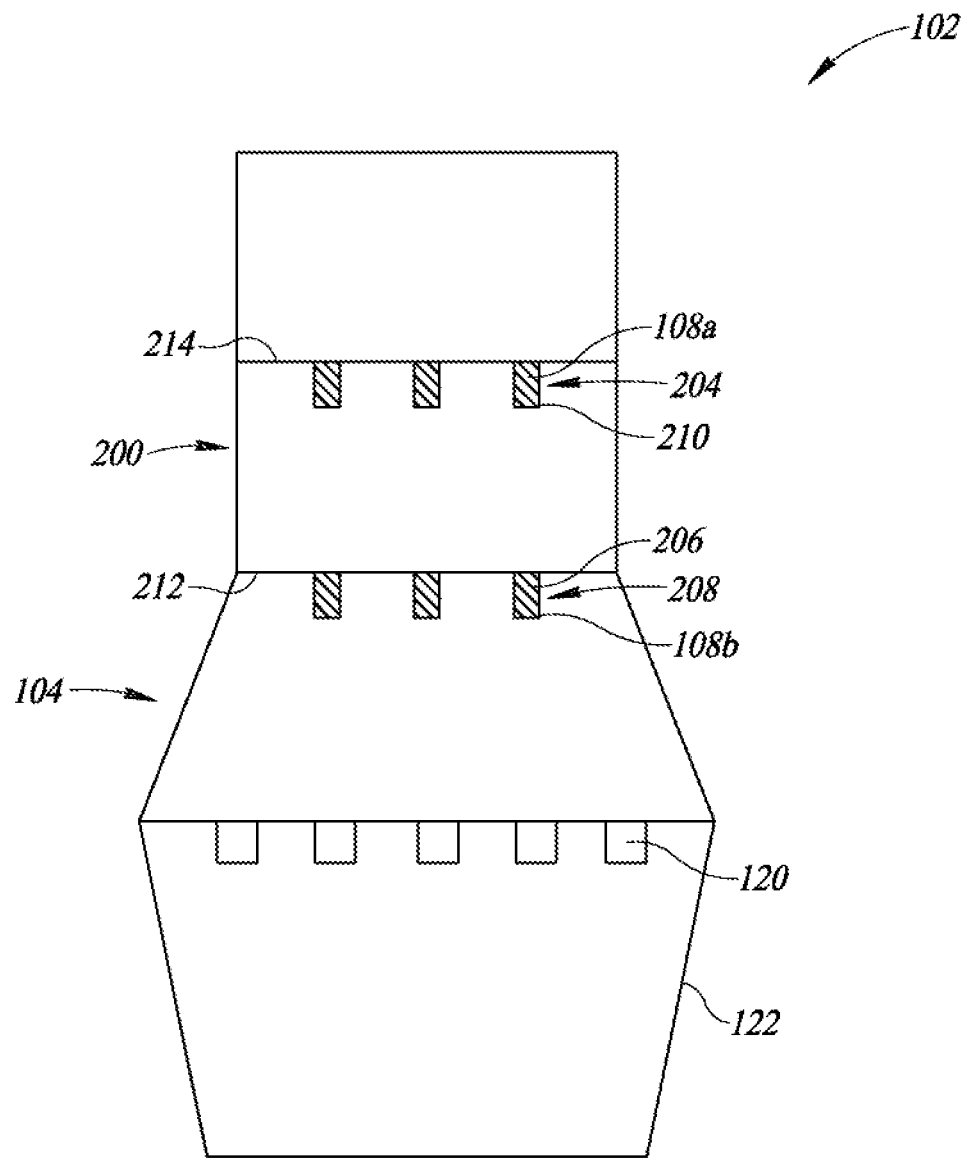
FIG. 4 is an isometric diagram showing the protection apparatus connected to a lighting subsystem and a control subsystem of FIG. 1.

FIG. 4 shows the protection apparatus 200 connected to the control subsystem 102 and the lighting subsystem 104. The control subsystem 102 is connected at the second side 214 of the protection apparatus 200 and the lighting subsystem 104 is connected at the first side 212 of the protection apparatus 200 opposite to the second side 214. Although the protection apparatus 200 is depicted as being connected on a top side of the lighting subsystem 104 opposite to the light sources 120, the protection apparatus 200 may be installed at least partially within the lighting subsystem 104 in some embodiments. For instance, the housing 202 of the protection apparatus 200 may be at least partially located between upwardly extending sidewalls of the lighting subsystem 104 that form a recess or cavity. The lighting subsystem 104 may have an upper wall with an aperture into which the first side 212 of the protection apparatus 200 may be inserted for twist-locking connection of the lighting subsystem 104 and the protection apparatus 200.

One or more electrical components of the control subsystem 102 are connected to one or more electrical components of the protection apparatus 200 as a result of the connection between the connector elements 108a and corresponding connector elements 210 of the second connector 208. One or more electrical components of the lighting subsystem 104 are also connected to one or more electrical components of the protection apparatus 200 as a result of the connection between connector elements 108b and corresponding connector elements 206 of the first connector 204.

One or more subsystems of the protection apparatus 200 may electrically protect the electrical components of other subsystems attached thereto. When the control subsystem 102 is attached directly to the lighting subsystem 104, as shown in FIG. 1, the control subsystem 102 controls the application of mains power to the lighting subsystem 104 for illuminating the light sources 120 based on measurement of ambient light. In such a configuration, the control subsystem 102 controls closing of an electromechanical switch (e.g., relay) to provision mains power to the light sources 120 as a result of the measured ambient light being less than a threshold level. Closing the electromechanical switch in such a manner may cause significant wear of the switch over time due to, for example, contact arcing. In particular, some light sources have high inrush currents that occur when power is first applied. If the electromechanical switch has not fully settled, the high inrush current can cause arcing, which may result in electrical contact erosion over time and eventual failure.

In the configuration depicted in FIG. 4, one or more subsystems of the protection apparatus 200 protect the electromechanical switch of the control system 102 from various potentially adverse effects. For example, a protection module of the protection apparatus 200 may electrically protect one or more electrical components of the control subsystem 102 as a result of connection thereto, as described below in greater detail. In some embodiments, the protection apparatus 200 detects a state transition of the electromechanical switch from an open state in which the electromechanical switch is open and a closed state in which the electromechanical switch is closed. In the open state, in response to detecting a state transition from the open state to the closed state, the protection module may delay provisioning of the mains power to the electromechanical switch until it has had time to settle into the closed state, thereby preventing contact arcing in the switch. This greatly prolongs the longevity of the control subsystem 102, reducing the costs of maintenance and replacement associated with the lighting subsystem 104.

Figure 5:
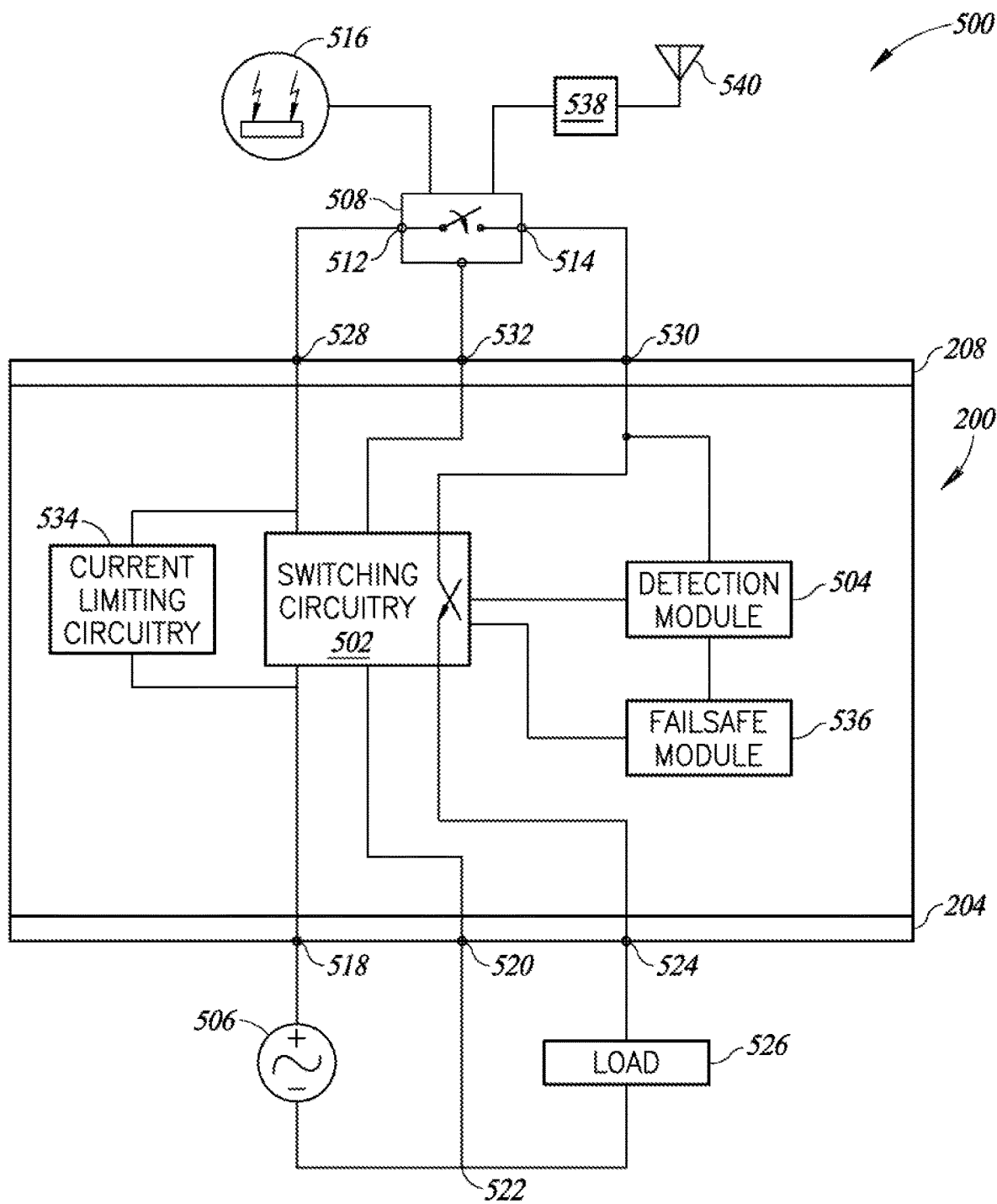
FIG. 5 is a schematic diagram showing the protection apparatus connected to elements of the lighting subsystem and the control subsystem.

FIG. 5 shows an electrical schematic diagram 500 of the protection apparatus 200 in association with electrical elements of other subsystems. The protection apparatus 200 includes circuitry that protects one or more switching elements of an attached device. Circuitry of the protection apparatus 500 includes a switching circuit 502 and a detection module 504. The switching circuitry 502 is an alternating current ("AC") switching circuit that receives mains power from an AC power source 506 and selectively provides AC power from the power source 506 to one or more switching elements 508 of a control subsystem 102 connected to the second connector 208 of the protection apparatus 200.

The power source 506 may be mains power provided, for instance, from a utility company. The protection apparatus 200 may be connected to an illumination device, such as a street lamp, via the first connector 204. A first node 518 of the first connector 204 may be connected to the power source 506 through the illumination device. A second node 520 of the first connector 204 may be connected to a second terminal of the power source 506 (e.g., negative terminal) through the illumination device. A third node 524 of the first connector 204 may be connected to a load 526 of the illumination device. The load 526 may correspond to the light sources 120 or a light source driver that drives the light sources 120 to illuminate.

The one or more switching elements 508 of the control subsystem 102 may correspond to electrical relay switches, such as a single-pole, single-throw switch, which can be controlled to be in an open state or a closed state. The control subsystem 102 may be configured such that the state of the switching element(s) 508 is controlled by one or more control elements. For instance, a photo-control element 516 comprising one or more photosensors may be associated with the control subsystem 102 and may control whether the switching element(s) 508 in the open state or the closed state based on a measurement of ambient light. As another example, a wireless interface element 538 associated with the control subsystem 102 may control whether the switching element(s) 508 are in the open state or the closed state based on wireless signals received by an antenna 540 thereof. The wireless interface element 538 may receive wireless signals transmitted by a user device and, in response, cause the switching element 508 to transition to a different state. An output node 528 of the second connector 208 may be connected to the first node 512 of the electromechanical switch 508, and a return node 530 of the second connector 208 may be connected to the second node 514 of the electromechanical switch 508. A third node 532 of the second connector 208 may connect a terminal of the electromechanical switch 508 to a terminal of the power source 506, such as the negative terminal.

The switching circuit 502 may comprise one or more switch elements for selectively providing power. In some embodiments, the switching circuit 502 includes at least a pair of enhancement mode MOSFETs connected to provide power during alternating positive and negative periods of the AC power. For instance, the pair of MOSFETs may be connected in series with their gate nodes electrically coupled to control circuitry of the switching circuit 502. In some embodiments, the switching circuit 502 includes a triode for alternating current ("TRIAC") that provides the AC power to the electromagnetic switch 508 as a result of receiving a signal at its gate node. The switching circuit 502 may include a switch control that controls the operation of the one or more switch elements. In particular, the switch control controls the switching element(s) to be in a closed state in which AC current flows through the switching circuit 502, or in an open state in which AC current does not flow through the switching circuit 502. In embodiments wherein more than one switching element is implemented, and when the switching circuit 502 is in the closed state, some of the switching elements may be closed while other switching elements are open. Those of ordinary skill in the art will appreciate that other switching circuit configurations may be implemented in the protection apparatus 200 without departing from the scope of the disclosure herein.

Selective provisioning by the switching circuit 502 of the AC power to the electromechanical switch 508 is based at least in part on a signal received over a connection 510 electrically coupling the detection module 504 and the switching circuit 502. The detection module 504 detects a transition of the electromechanical switch 508 between a first state and a second state. For example, the detection module 504 detects a transition of the electromechanical switch 508 between the open state and the closed state. The detection module 504 may provide a signal over the connection 510 causing the switching circuit 502 to provide or stop provisioning of AC power to the electromechanical switch 508 as a result of detecting a state transition in the electromechanical switch 508. The signal provided by the detection module 504 to the switching circuit 502 is provided at a time that the electromechanical switch 508 is in a steady closed state—that is, a state in which the electromechanical switch 508 is not bouncing. The detection module 504 may, in response to detecting the state transition, provide the signal to the switching element after a time delay or as a result of detection of a condition that indicates that the electromechanical switch 508 is in a steady closed state. Advantageously, because mains power is provided to the electromechanical switch 508 in a steady closed state, contact arcing is avoided and the longevity of the control subsystem 102 may be extended.

The detection module 504 may comprise hardware and software to detect the state, and transitions between states, of the electromechanical switch 508. The detection module 504 may include circuitry that is useable to detect whether the electromechanical switch 508 is in a closed state or open state. In one implementation, the detection module 504 includes voltage detection circuitry that detects if voltage from the power source 506 is being supplied to an output of the control subsystem 102 as a result of the electromechanical switch 508 being in the closed state. The voltage detection circuitry may cause a signal to be provided to the switching circuitry 502 based on the voltage detected at the control subsystem 102 (e.g., whether a 240V signal, 0V signal). In some implementations, the detection module 504 includes impedance detection circuitry that detects the impedance of the electromechanical switch 508 between the first node 512 and the second node 514. The detection module 504 may include hardware and/or software for detecting a change in state of the electromechanical switch 508. One example of hardware of the detection module 404 that detects state changes may include comparison circuitry that compares a current value corresponding to a current impedance of the electromechanical switch 508 with a reference value corresponding to a threshold impedance and, based on whether the current value is less than (or greater than depending on the design of the hardware) the reference value, providing an output corresponding to the current value relative to the reference value. Such hardware may include an op-amp comparator circuit or Schmitt trigger, for example. The detection module 504 may further include a microcontroller that provides control signals to the switching circuit 502 for controlling a state of one or more switching elements of the switching circuit 502.

As a result of detecting a transition of the electromechanical switch 508 from one state to another state (e.g., open state to closed state), the detection module 504 may wait a certain period of time before providing a signal causing the switching circuit 502 to provide power to the electromechanical switch 508. In particular, the detection module 504 may initiate a time delay in response to detection of the state transition and, upon expiration of the time delay, provide the signal to the switching circuit 502. The time delay may be implemented using hardware, software, or a combination thereof, as described below. An output of the detection module 504 is electrically coupled to one or more terminals of the switching circuit 502 for receiving signals to cause the switching circuit 502 to begin providing mains power to an output of the protection apparatus 200 coupled to the electromechanical switch 512 in a steady closed state.

In one embodiment, software implementation of the time delay may involve comparing an elapsed time since detecting the transition with a preprogrammed time period value corresponding to an amount of time of the time delay. The software may be a set of instructions stored in data storage (e.g., ROM, RAM) of the protection apparatus 200 that, as a result of execution by one or more processors of the protection apparatus 200, cause the detection module 504 to perform one or more operations described herein.

Figure 6:
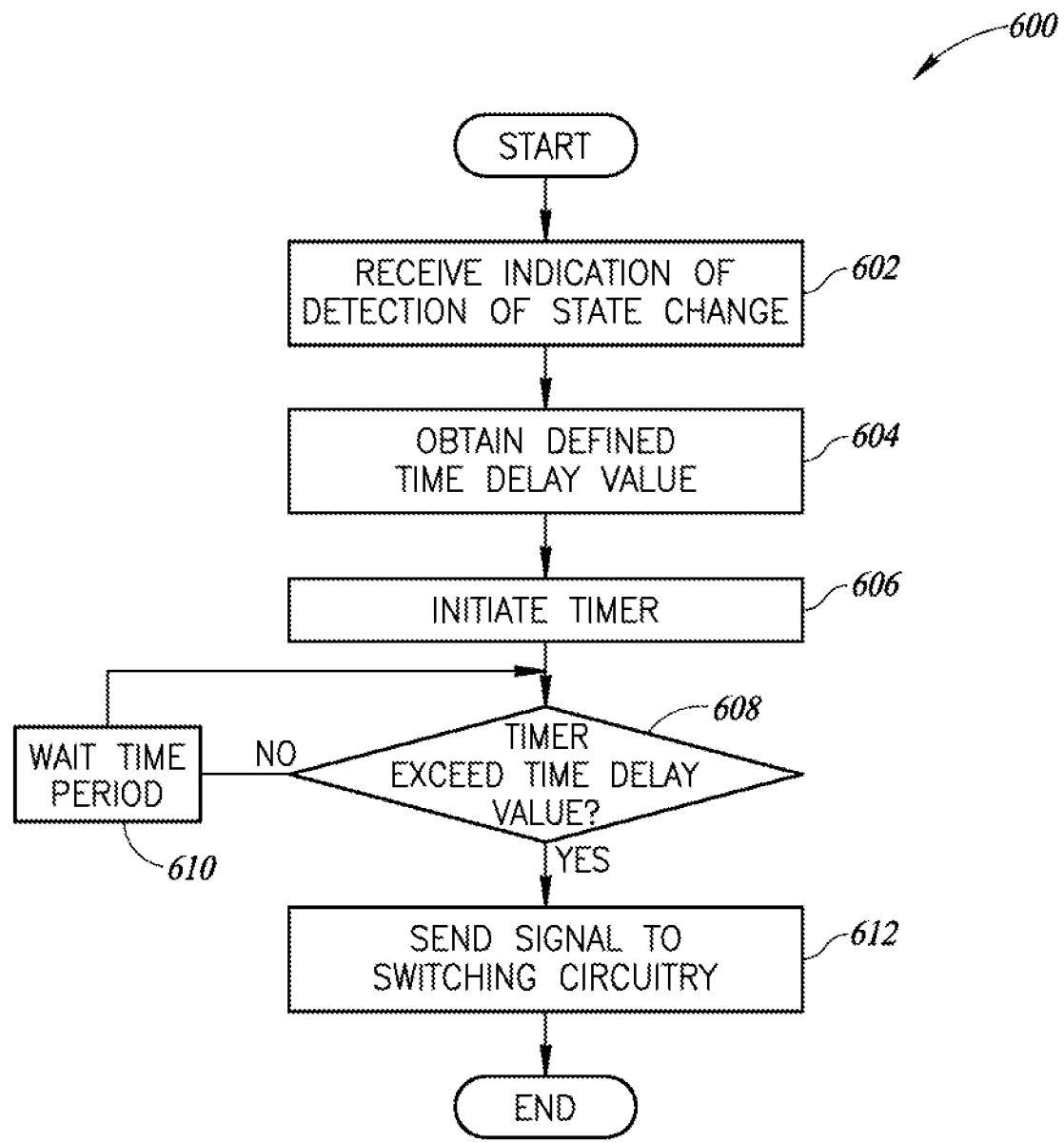
FIG. 6 is a flow diagram showing a low level method of executing a time delay.

A time delay process 600 performed by one or more processors of the protection apparatus 200 executing the set of instructions is shown in FIG. 6. The process 600 begins by receiving 602 an indication that a state transition of the electromechanical switch 508 was detected. The indication may be received from hardware of the detection module 504 as described herein. At 604, the one or more processors obtain a preprogrammed time delay value, which may be a numeric value, from data storage of the protection apparatus 200. The preprogrammed time delay value is a value corresponding to an amount of time that it takes the electromechanical switch 508 to reach a steady state condition in which the switch 508 is not bouncing after being closed.

Next, the one or more processors initiate 604 a timer. Initiating a timer may include storing a current time value in memory of the protection apparatus 200, or causing a software timer function to begin counting upward from zero. The one or more processors then compare a value of the timer with the preprogrammed time delay value to determine 608 whether the timer exceeds the preprogrammed time delay. If not, the one or more processors may optionally wait 610 for a preprogrammed period of time by executing a set of predetermined operations that occupy a period of time—for example, executing a sleep function call. As a result of determining that the timer value exceeds the time delay value, the one or more processors may send 612 a signal to the switching circuit 502 that causes the switching circuit 502 to provide mains power to an output of the protection apparatus 200. The signal may be a digital signal containing data instructing the switching circuit 502 to provide power, or an analog signal having characteristics that cause the switching circuit 502 to provide power. Thereafter, the process 600 is concluded. The one or more processors of the protection apparatus 200 executing the set of instructions may be a collection of one or more central processing units, field programmable gate arrays, application specific integrated circuits, or other processor known to those of ordinary skill in the art.

In one embodiment, hardware implementation of the time delay may involve a timer circuit, and may include additional circuitry. The timer circuit may include an integrated circuit ("IC") that, in response to receiving a trigger signal have a set of characteristics, will output a signal after an amount of time has elapsed since receiving the trigger signal. The amount of time may be based at least in part on characteristics of electronic components (e.g., resistor values, capacitor values) electrically coupled to pins of the integrated circuit. An example of such an integrated circuit is a 555 timer oscillator IC, such as the LM555CMX produced by ON Semiconductor, or the NA555DR produced by Texas Instruments. Signal conditioning circuitry may be electrically coupled to an output of the timer circuit to manipulate characteristics of an output to cause the switching circuit 502 to provide power after the time delay period has expired.

The switching circuit 502, as a result of receiving the signal from the detection module 504 after expiration of the time delay, provides mains power to the output node 528 of the protection apparatus 200. Providing mains power includes operating one or more switching elements to transition from an open state in which current does not flow through the switching element between the first node 518 and the output node 528 to a closed state in which current flows through the switching element between the first node 518 and the output node 528. In the closed state, a closed circuit is established extending from the power source 506, through the switching circuit 502 to the output node 528, then through the closed electromechanical switch 508 to the return node 530, then back through the switching circuit 502, and to a second terminal of the power source 506 via the second node 520.

The protection apparatus 200 may further include current-limiting circuitry 534 used to limit inrush current (e.g., due to charging capacitance) to the electromechanical switch 508 and/or the load 526 upon closing of the switching element(s) of the switching circuit 502, which functionality protects the electromechanical switch 508 and/or the load 526 from harm due to excessive current. In one embodiment, the current-limiting circuitry 534 includes a capacitive load pre-charge circuit connected in parallel with the switching circuit 502 between the first node 518 and the output node 528. The capacitive load pre-charge circuit has a resistance which is relatively low (e.g., less than 500Ω, less than 200Ω, less than 100Ω) compared to the resistance of the switching elements of the switching circuit 502 when the switching circuit 502 is in the opened state. The resistance of the capacitive load pre-charge circuit 302 is also relatively high compared to the resistance of the switching circuit 502 when the switching element(s) is in the closed state. AC current flows through the electromechanical switch 508 to the load 526 through the capacitive load pre-charge circuit when the switching circuit 502 is opened, and AC current flows from the electromechanical switch 508 to the load 526 through the switching circuit 502 when the switching circuit 502 is closed.

Additionally, the protection apparatus 200 may include a failsafe module 536 used to assume control of the lighting subsystem 104 in the event that the control subsystem 102, or components thereof, fail. If the control elements of the control subsystem 102 (e.g., photo-control element 516) or the electromechanical switch 508 fail or are not properly operating, the lighting subsystem 104 may not turn on or off or otherwise function properly. For instance, failure of a photosensor used to turn the light source ON or OFF dependent upon the measured ambient light level may result in the light source remaining in a continuously ON state in the event the automatic control mechanism fails in a "closed" position permitting current flow to the light source or in a continuously OFF state in the event the automatic control mechanism fails in an "open" position interrupting current flow to the light sources 120 of the lighting subsystem 102. Either failure mode results in an unacceptable mode of operation of the light source. As another example, the failure of the electromechanical switch 508 in an open state or a closed state also results in the light sources 120 of the lighting subsystem 104 being in an unacceptable state for a significant period of a day.

Figure 7:
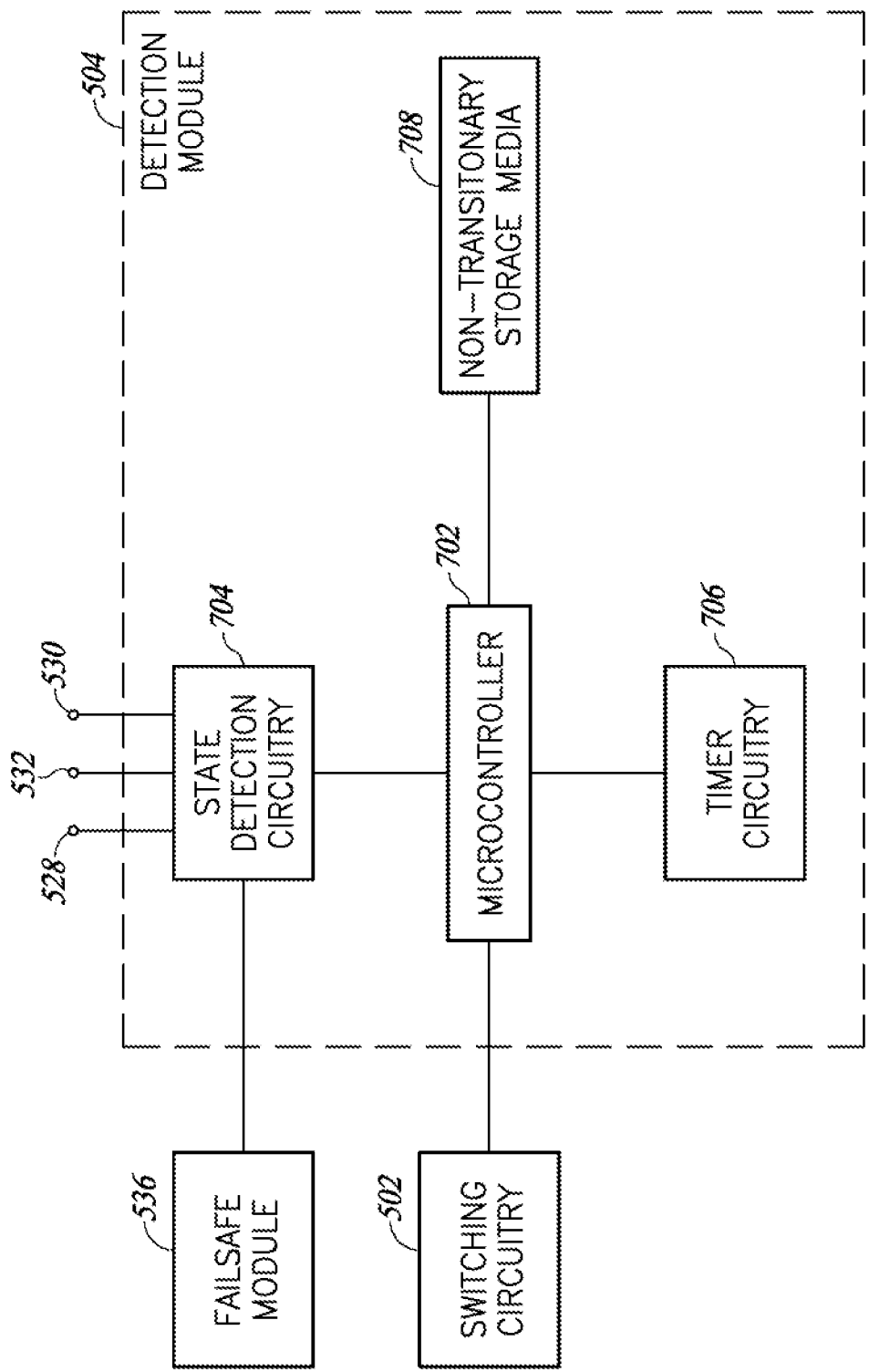
FIG. 7 is a schematic diagram of a detection module of the protection apparatus.

FIG. 7 shows an electrical schematic diagram of a detection module 504 interconnected with other elements of the protection apparatus 200 according to one or more embodiments. The detection module 504 includes a microcontroller 702, state detection circuitry 704, timer circuitry 706, and one or more non-transitory data storage media 708. The microcontroller 702 may take any of a variety of forms, for example a microprocessor, programmable gate array (PGA), application specific integrated circuit (ASIC), digital signal processor (DSP), etc. The microcontroller 702 may require very limited computing power, for example an 8-bit microcontroller may be sufficient.

The state detection circuitry 704 is useable to detect whether the electromechanical switch 508 is in a closed state or open state. The state detection circuitry 704 may be electrically coupled to the output node 528, the return node 530, and/or the third node 532 of the protection apparatus 200. As discussed above, the state detection circuitry 704 may include hardware and/or circuitry to detect the state of the control subsystem 102, such as impedance detection circuitry that detects the impedance of the electromechanical switch 508. The state detection circuitry 704 may send a signal to the microcontroller 702 indicating the state of the switch 508, or may send a signal indicating a measurement obtained of the switch 508. The state detection circuitry 704 may send the signal in response to a request from the microcontroller 702, or may send the signal on a periodic basis. The microcontroller 702 may detect a transition of the switch 508 from one state to another state based on the signal received from the state detection circuitry 704.

As a result of detecting the transition of the switch 508 from one state to another state (e.g., open state to closed state), the microcontroller 702 may wait a defined period of time before causing the switching circuitry 502 to transition from one state to another state. In one implementation, the microcontroller 702 may send a signal to the timer circuitry 706 causing the timer circuitry 706 to initiate a time delay of the defined period of time. As discussed above with respect to FIG. 6, the time delay may be implemented via hardware or software. The period of time may be defined by a set of hardware components (e.g., capacitors, resistors), or may be defined in memory (e.g., in the storage media 708). After expiration of the time delay, the timer circuitry 706 sends a signal back to the microcontroller 702 indicating that the defined period of time has elapsed. In response to receiving the signal from the timer circuitry 706 indicating expiration of the defined period of time, the microcontroller 702 may send a control signal causing the switching circuitry 502 to transition from one state to another state (e.g., open state to closed state). Although the timer circuitry 706 is depicted and described as being separate from the microcontroller 702, the timer circuitry 706 may be a part of the microcontroller 702 in at least some implementations.

The one or more non-transitory storage media 708 may take any of a variety of forms, for example electrically erasable programmable read only memories (EEPROMs), flash memories, etc. In at least some instances, the one or more non-transitory storage media 708 may wholly or partially comprise removable storage media such as secure digital (SD) or compact flash (CF) cards, universal serial bus (USB) memory sticks, or similar. The one or more non-transitory storage media 708 may have sufficient capacity to store or otherwise retain one or more sets of machine executable instructions that, as a result of execution by the microcontroller 702, cause the detection module 504 to perform one or more operations described herein.

Figure 8:
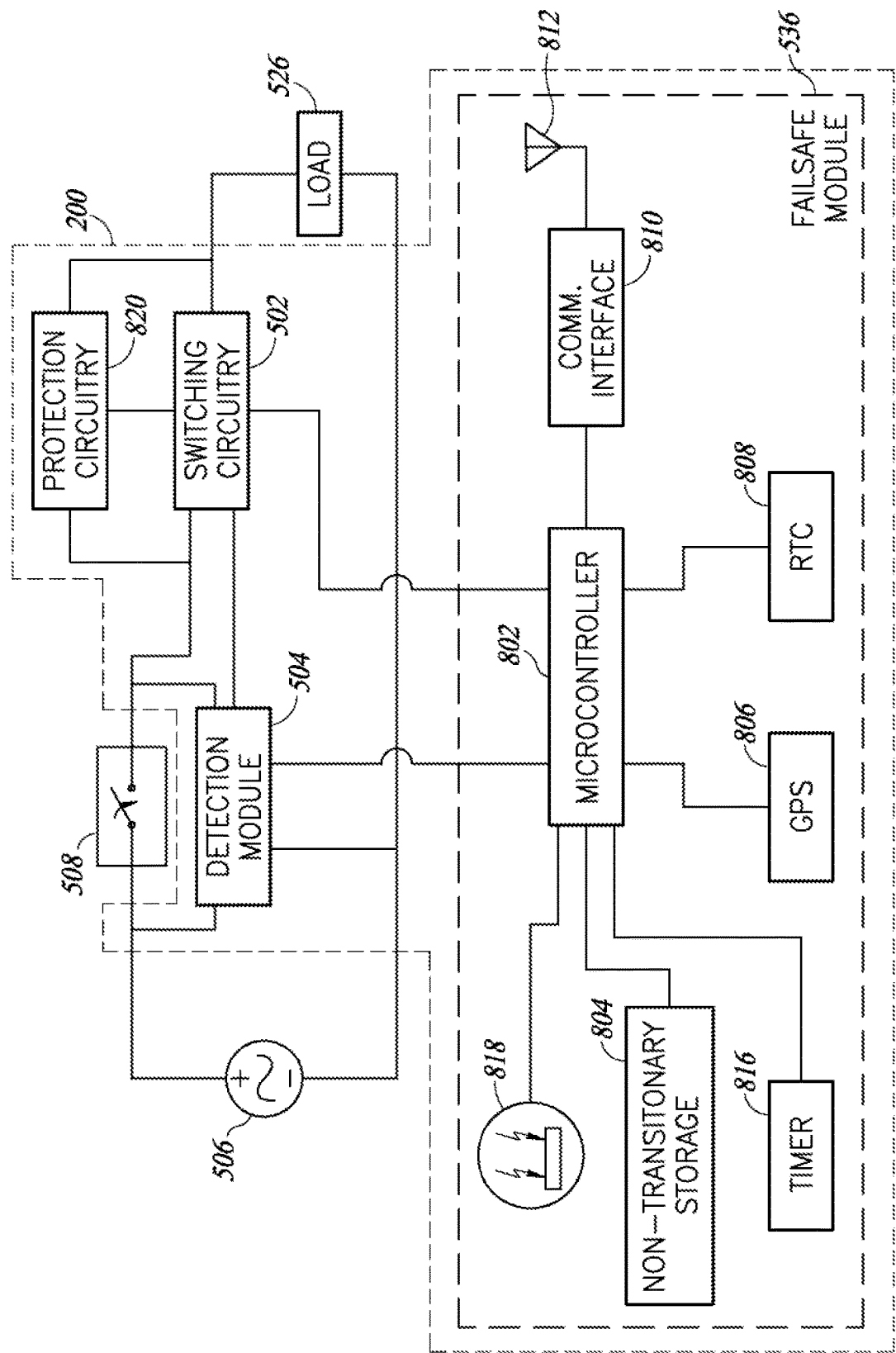
FIG. 8 is a schematic diagram of a failsafe module coupled to components of the protection apparatus according to one or more non-limiting embodiments.

FIG. 8 shows an electrical schematic diagram of the failsafe module 536 interconnected with other elements of the protection apparatus 200 according to one or more embodiments. The failsafe module 536 may include a combination of hardware software useable to detect failure or improper operation of the control subsystem 102, and assume one or more control functions to promote proper operation of the lighting subsystem 102. The failsafe module 536 includes a microcontroller 802 communicably coupled to the detection module 504 and one or more non-transitory storage media 804. The failsafe module 504 may further include a global positioning system ("GPS") receiving device 806, a real-time clock 808, a communication interface 810 and an antenna 812, a timer circuit 816 (e.g., a digital timing circuit or an analog timer circuit), and one or more photosensitive transducers 818 (e.g., photodiode, photoresistor, phototransistor). The microcontroller 802 may be the same as the microcontroller of the detection module 504, or it may be a separate microcontroller.

The failsafe module 536 transitions the protection apparatus 200 from a normal mode in which the control subsystem 102 is determined as operating normally, and a failure detection failure detection mode in which the failsafe module 536 assumes control of supplying power from the power source 506 to the lighting subsystem 104. In some implementations, the microcontroller 802 of the failsafe module 536 may send control signals to the switching circuitry 502 causing the switching circuitry 502 to transition between an open state and a closed state based on one or more factors, such as amount of light detected or the time of day. Such implementations may be used, for example, where failure or improper operation of the control subsystem 102 results in the electromechanical switch 508 remaining in a closed state. In some implementations, the protection apparatus 200 may include bypass circuitry (not pictured), such as an electromechanical switch (e.g., single-pole, double-throw switch) and/or a set of semiconductor devices (e.g., transistors), that the failsafe module 536 may control to establish an electrical connection for supplying power from the power source 536 to the switching circuitry 502 without the electromechanical switch 508. Such implementations may be used, for instance, in the event the control subsystem 102 fails or is operating improperly with the electromechanical switch 508 remaining or "stuck" in the open state failure detection mode As a result of the failsafe module 536 operating in the normal mode (e.g., determining that the control subsystem 102 is operating properly), the failsafe module 536 causes the switching circuitry 502 to operate normally, as described herein, such as by not controlling operation of the switching circuitry 502. In the normal mode, the switching circuitry 502 is controlled as a result of a signal provided from the detection module 504. By contrast, as a result of the failsafe module 536 operating in the failure detection mode, the failsafe module 536 assumes control of switching circuitry 502 operation. In implementations wherein bypass circuitry is included, the failsafe module 536 may operate the bypass circuitry to bypass the control subsystem 102.

The microcontroller 802 may transition the subsystem between the normal mode and the failure detection mode based on determination of a status of the control subsystem 102—for instance, a functional status regarding whether the control subsystem 102 is properly operating. The microcontroller 802 may obtain information from the detection module 504 regarding operation of the control subsystem 102 and use that information to determine the status of the control subsystem 102. As a result of determining that the control subsystem 102 is improperly operating or has experienced a failure, the microcontroller 802 may cause the bypass switch 814 to transition from the normal mode to the failure detection mode.

Obtaining information from the detection module 504 by the microcontroller 802 may include receiving data or a signal indicating a state or transition of the electromechanical switch 508. The information may indicate that the current or recently detected state of the switch 508, or may indicate a current or recently detected transition of the switch 508. The information may be provided in response to detecting the state or the transition by the detection module 504, or may be provided in response to a request from the microcontroller 802 to the detection module 504 to provide the information.

The microcontroller 802 may store the information obtained from the detection module 504 in the non-transitory storage media 804 and use the information to determine the status of the electromechanical switch 508. The microcontroller 802 may utilize signals or information in addition to the information obtained from the detection module 504 to determine the status of the switch 508. The status may be determined based on a number of times the switch 508 transitions from one state to another state within given period of time (e.g., a 12-hour period, 24-hour period), or whether the switch transitions from one state to another state at approximately an expected time.

The microcontroller 802 may take any of a variety of forms, for example a microprocessor, programmable gate array (PGA), application specific integrated circuit (ASIC), digital signal processor (DSP), etc. The microcontroller 802 may require very limited computing power, for example an 8-bit microcontroller may be sufficient. The microcontroller 802 may be communicatively coupled to receive the information from the detection module 504. Although the failsafe module 536 is depicted and described as being separate from other elements of the protection apparatus 200, the failsafe module 536 or parts thereof may be included in other elements of the protection apparatus 200. For instance, the microcontroller 802 and the microcontroller 702 may be the same, or part of the same, microcontroller. As another example, the timer circuitry 706 and the timer 816 may be the same, or part of the same, device.

The one or more non-transitory storage media 804 may take any of a variety of forms, for example electrically erasable programmable read only memories (EEPROMs), flash memories, etc. In at least some instances, the one or more non-transitory storage media 804 may wholly or partially comprise removable storage media such as secure digital (SD) or compact flash (CF) cards, universal serial bus (USB) memory sticks, or similar. The one or more non-transitory storage media 804 may have sufficient capacity to store or otherwise retain one or more sets of machine executable instructions, year-long daily sunrise and sunset times at a variety of latitudes, open storage for acquired data indicative of one or more solar events. In some instances, the microcontroller 802 may automatically overwrite all or a portion of the data stored within the non-transitory storage media 804, for example every number N of daily cycles. Diurnal data collected over periods ranging from 183 to 366 days can be used to identify solar or astronomical events such as solstices and equinoxes and also to provide sufficient data to accurately forecast solar events such as sunrise times, sunset times, solar noon times, solar midnight times, dusk times, dawn times, and the like.

In one embodiment, the microcontroller 802 may determine the status of the electromechanical switch 508 using the timer circuit 816. The timer circuit 816 may produce control signals at defined time intervals or time periods. For instance, the timer circuit 816 may count from zero up to a defined time value (e.g., a time value corresponding to a 24-hour time period), and in response to reaching the defined value, send a control signal to the microcontroller 802 and begin counting up to the defined time value again. During the time period, the microcontroller 802 may obtain information from the detection module 504 indicating a set of states and/or transitions of the switch 508. As a result of determining, based on the information obtained, that the switch 504 has not transitioned from one state to another state at least a defined number of times in the time interval (e.g., twice in a 24-hour period), the microcontroller 802 may determine that the control subsystem 102 is not operating properly. If, on the other hand, the information indicates that the switch 508 has transitioned at least the defined number of times during the time period, the control subsystem 102 may be determined to be properly operating. The microcontroller 802 may obtain the information from the detection module 504 in a periodic manner, such as by obtaining information from the module 504 once every minute or once every hour, for example.

The microcontroller 802 may also use information obtained from the RTC 808 to determine the status of the control subsystem 102 in at least some embodiments. the microcontroller 802 correlates the time of various astronomical or solar events such as sunrise, sunset, dusk or dawn with one or more expected, forecasted, or predicted times of occurrence to verify the operation of the control subsystem 102 within one or more threshold values. In some instances, the microcontroller 802 may determine the time at which one or more ambient lighting conditions corresponding to a well-defined astronomical event such as a sunrise or sunset event occur. In other instances, the microcontroller 802 may determine the time or time range at which one or more ambient lighting conditions corresponding to a less well defined astronomical event such as a dusk event or a dawn event occurs.

The RTC 808 included in the failsafe module 536 may be an integrated or discrete real time clock circuit. For example, an integrated real time clock integrated circuit such as the PCF2129A as manufactured by NXP Semiconductors (Eindhoven, The Netherlands) may be used in some instances. Other commercially available semiconductor chips providing real time clock functionality may be equally employed. Alternatively, the microcontroller 802 may implement a real time clock based on timing signals produced by a controller or processor clock or similar oscillator. The timer circuit 816 may produce control signals at defined periods following an occurrence of defined times as indicated by the real-time clock circuit 808.

The microcontroller 802 can store the information to correlate or create logical relationships between the sensed levels and a time (e.g., real time) as indicated by the real time clock circuit 808. The microcontroller 802 can use the information to determine times as indicated by the real time clock circuit 808 (i.e., in the temporal reference frame of the real time clock circuit 808) with the solar cycle for any daily cycle, and to determine a status of the control subsystem 102 accordingly. For instance, the microcontroller 802 may determine that the switch 508 should transition from one state to another state in a certain period of time (e.g., within an hour of dusk or dawn) based on temporal information provided by the RTC 808 and, if information obtained from the detection module 504 does not indicate that the transition occurred within the period of time, determine that the control subsystem 102 is improperly operating.

The period of time in which a transition event of the electromechanical switch 508 is expected or predicted to occur may be based on local geographic, meteorological, atmospheric or temporal data that is either determined by the failsafe module 536, stored within the non-transitory storage media 804, provided by an external source such as a network connection to the communications interface 810, or some combination thereof. Geographic data may include the physical latitude or longitude of the protection apparatus 200 which is determinable by the microcontroller 802 using, for example, the global positioning receiver 806 that is either temporarily or permanently communicably coupled to the protection apparatus 200 directly or via communications interface 810. Such geographic data may also be communicated on a periodic or one-time basis to the protection apparatus 200 and stored in a non-volatile portion of the non-transitory storage media 804, for example via the communications interface 810. Temporal data may include a Julian date or a calendar date and time. Such temporal data may be transmitted on a periodic or one-time basis to the protection apparatus 200 via the communications interface 810 and tracked using the timer 816 or the real time clock circuitry 808. Atmospheric data may include cloud cover data that is transmitted near-real time to the protection apparatus 200 via a network connection to the communications interface 810.

The one or more wired or wireless communications interfaces 810 may be disposed within the housing 202 of the protection apparatus. Such communications interfaces 810 may include, but are not limited to one or more optical (e.g., infrared), wired (e.g., IEEE 802.3, Ethernet, etc.) or wireless (e.g., IEEE 802.11—Wi-Fi®; cellular—GSM, GPRS, CDMA, EV-DO, EDGE, 3G, 4G; Bluetooth®; ZigBee®; Near Field Communications; etc.) communication interfaces. The one or more communication interfaces 810 may be communicably coupled to the microcontroller 802 or the one or more non-transitory storage media 804 and can be useful in bi-directionally exchanging data between the protection apparatus 200 and one or more external devices. One or more antenna 812 for transmitting or receiving wireless communications signals may be communicably coupled to the wireless communications interfaces 810.

In at least some instances, all or a portion of the temporal data stored in the non-transitory storage media 804 may be intermittently confirmed or otherwise verified using one or more external devices or systems via the communications interface 810. In one instance, the date and time may be verified using an IEEE 802.11 or Bluetooth wireless connection to a portable device such as a cellular telephone or portable computing device having the correct time and date. In another instance, the date and time may be verified using a GSM, CDMA or similar wireless connection to a cellular network having the correct time and date.

In other instances, all or a portion of the geographic data stored in the non-transitory storage media 804 may be intermittently confirmed or otherwise verified against one or more external devices or systems via the communications interface 810. In one instance, geographic location data may be verified using an IEEE 802.11 or Bluetooth wireless connection to a portable device such as a cellular telephone or portable computing device having a global positioning system (GPS) receiver capable of geolocating the protection apparatus 200. In other instances, the geographic location may be verified by triangulation using a GSM, CDMA or similar wireless connection to a cellular network.

The microcontroller 802 may transmit information regarding the status of the control subsystem 102 via the one or more communication interfaces 810. The microcontroller 803 may transmit information indicating that the control subsystem 102 is properly operating or improperly operating, for example. The microcontroller 102 may also transmit information indicating that the protection apparatus 200 is operating in failure detection mode and that the failsafe module 536 has assumed control of operation of the lighting subsystem 104. The failsafe module 536 may transition between the normal mode and the failure detection mode as a result of receiving a communication signal via the communication interface 810 from an external device commanding it to do so. The communications interface 810 enables a user of a device external to the protection apparatus 200 to control, interrogate, and communicate with the protection apparatus 200 from ground level. The user may, via the communication interface 810, set lighting schedules, test the functionality of devices connected thereto (e.g., the lighting subsystem 104, the control subsystem 102), record events of the connected devices (e.g., transition events of the control subsystem 102).

In some embodiments, the microcontroller 802 may determine the status of the control subsystem 102 based at least in part on signals or information obtained from the one or more photosensitive transducers 818. The photosensitive transducer 818 may be exposed to ambient light and provide a signal or information to the microcontroller 802 indicating characteristics of the ambient light—for example, whether the ambient light level exceeds a certain luminance level or a measurement of the luminance of the ambient light. The microcontroller 802 may process the signal or information obtained from the photosensitive transducer 508 to determine the status of the control subsystem 102. For instance, the microcontroller 802 may determine that the switch 508 should be in a closed state as a result of the signal or information received from the photosensitive transducer 818 indicating that the level of ambient light (e.g., luminance) is less than a threshold level. Conversely, the microcontroller 802 may determine that the switch 508 should be in an open state as a result of the signal or information received from the photosensitive transducer 818 indicating that the level of ambient light (e.g., luminance) is greater than or equal to the threshold level.

The microcontroller 802 may compare the predicted state of the control subsystem 102 with the information regarding the state of the control subsystem 102 detected by the detection module 504. Based on a result of the comparison, the microcontroller 802 may determine whether the control subsystem 102 is operating properly or improperly. In some implementations, the microcontroller 802 may access data stored in the storage media 804 to determine the threshold level. In some implementation, the predicted state of the control subsystem 102 may be ascertained based on a look-up table stored in the storage media 804.

The protection apparatus 200 may also include protection circuitry 820 that protects parts of the protection apparatus 200 and/or the load 526. In some implementations, the protection circuitry 820 includes short circuit detection circuitry that detects a short circuit condition between nodes of the protection apparatus 200. The short circuit detection circuitry may protect against potentially harmful conditions in which one or more connector elements of the protection apparatus 200 are improperly connected to connector elements of the lighting subsystem 104 or the control subsystem 102. In response to detecting a short circuit, the short circuit detection circuitry may cause one or more conditions to occur in the protection apparatus 200 preventing damage—for example, by providing a signal to the switching circuitry 502 causing it to stay in the open state as long as the short circuit is detected. In some implementations, the protection circuitry 820 includes undervoltage detection circuitry that detects an undervoltage condition in the power supplied from the power source 506 drops below a certain voltage. The undervoltage detection circuitry may cause one or more conditions to occur in the protection apparatus 200 preventing damage to the protection apparatus 200 or the load 526. The undervoltage detection circuitry may, as one example, provide a signal to the switching circuitry 502 causing it to stay in the open state. The protection circuitry 820 may include other protection subcircuits, such as in-rush current limiting circuitry described herein.

Figure 9:
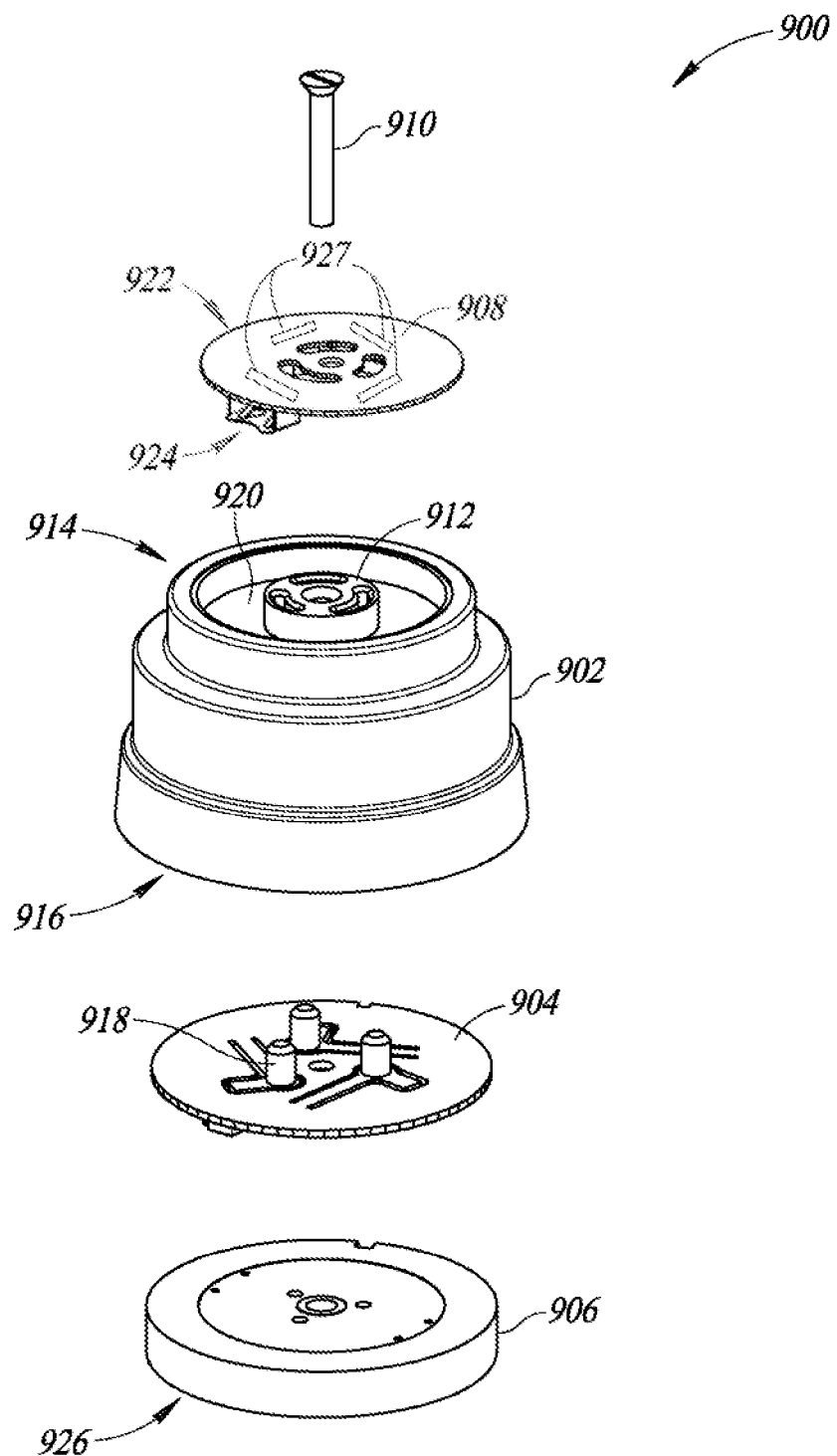
FIG. 9 is a partially exploded view of the assembly including the protection apparatus provided with a twist-lock receptacle at a first side according to one or more non-limiting embodiments.

FIG. 9 shows an exploded view of an assembly 900 of the protection apparatus 200 according to one or more embodiments. The assembly includes a housing main body 902 for housing parts of the protection apparatus 200, a primary printed circuit board ("PCB") 904, a base member 906, a secondary PCB 908, and a mounting coupler 910. The housing main body 902 depicted has a substantially cylindrical shape with a connector 912 located on an upper portion 914 thereof. The connector 912 depicted includes a set of concentrically arranged female electrical receptacles for receiving male connector elements of the control subsystem 102 discussed herein. In some embodiments, however, the connector 912 may include male connector elements depending on the configuration of the device to which the protection apparatus 200 is to be connected.

The primary PCB 904 may include a first face and an opposing second face opposed across a thickness. The first face and the second face may each be planar, and may be parallel to each other. The primary PCB 904 may be comprised of one or more of a non-conductive resin or composite, such as fiberglass FR4, epoxy/Kevlar fiber or thermosetting plastic, or ceramic, or metal covered with nonconductive coating or film, or other non-conductive material. In some implementations, the primary PCB 904 may be circular in shape and may have a diameter of about 5 inches, although such shapes and dimensions should not be considered limiting. In some implementations, the primary PCB 904 may include a plurality of electrical traces or other electrically conductive pathways for conducting electrical signals. The primary PCB 904 may include one or more apertures ("vias") that extend between the first face and the second face, with such apertures being used to electrically couple electronic components to one or more of the electrical traces or other conductive pathways. Such electrical coupling may be performed, for example, manually through soldering the electronic components, and/or such electrical coupling may be performed, for example, mechanically or automatically using pick-and-place technology. In some implementations, the electronic components and electrical traces and/or pathways may form one or more electronic circuits that operate in accordance with the description of the protection apparatus 200.

The primary PCB 904 may be positioned within a cavity or a recess on a lower portion 916 of the housing main body 902 opposite to the upper portion 914. The primary PCB 904 may be positioned within the cavity or recess such that electrical contact portions 918 of the primary PCB 904 are appropriately aligned with the connector elements (e.g., receptacles) of the connector 912. The base member 906 may be positioned within the cavity or recess underneath the primary PCB 904 to enclose the primary PCB 904 within the cavity. The base member 906 may have one or more vias extending therethrough to allow communicable coupling of electrical and/or electronic components installed on the primary PCB 904 with the first connector 204 or other external connection of the protection apparatus 200 described herein. The cavity or recess of the housing main body 902 may be defined by sidewalls of the main body 902 extending downwardly from the upper portion 914. The distance or diameter between opposing sidewalls of the housing main body 902 may be such that the primary PCB 904 and the base member 904 fit snuggly within the cavity. In some embodiments, the diameter or width of the base member 906 may be greater than the diameter or width of the primary PCB 904. The cavity may have a tapered shape or a tiered shape such that the base member 906 may abut an inner surface of the cavity to fully enclose the primary PCB 904 therein. In at least some embodiments, an O-ring may be installed between adjacent surfaces of the cavity and the base member 906 to create a seal protecting the primary PCB 904 installed within the cavity. The secondary PCB 908 may be installed in an upwardly-facing recess 920 of the housing main body 902 sized and shaped to receive the secondary PCB 908. The recess 920 may have an annular shape with the connector 912 located at the center and upwardly extending sidewalls at the periphery. The secondary PCB 908 may include a first surface 922 and an opposing second surface 924 separated by a thickness. The secondary PCB 908 may be annular in shape and may be sized to be received within the recessed portion 920 of the housing main body 902. In some implementations, the secondary PCB 908 may be physically coupled to the main body 902 within the recessed portion 920 using silicone or some other adhesive.

In at least some implementations, the secondary PCB 908 may include one or more electrical contact pads 927 (shown as a labeled representations rather than particular shapes) located at least partially on the first surface 922 that may electrically couple with electrical contacts on other devices mounted on the connector of the device to be attached to the protection apparatus 200. The electrical contact pads 927 may be arranged around a central axis that extends through the central portion of the secondary PCB 908. In some implementations, two or four electrical contact pads may be used to provide a five or seven pin NEMA photo-control twist lock socket, respectively. Such electrical contact pads 927 may be used to provide low voltage control of the controllable device. For example, many luminaires have 0 to 10 volt dimming control, where the low voltage signal sets the brightness of the luminaire. Digital Addressable Lighting Interface (DALI) control may use two low voltage control lines, which may be connected via two of the electrical contact pads 927 located at least partially on the first surface 922. In some implementations, the electrical contact pads 927 may be plated with corrosion resistant plating such as gold or tin plating. In some implementations, the electrical contact pads 927 may be connected to the primary PCB 904 by a pluggable post and header connector. Such a pluggable post and header connector may thereby physically couple the secondary PCB 908 to the other components of the device to be attached to the protection apparatus 200. In some embodiments, the electrical contact pads 927 may be electrically coupled to an output at the lower portion 916 of the assembly 900—for instance, by one or more wires, coupled to the electrical contact pads 927, that extend from the second surface 924 to and/or through apertures located on the base member 906.

The mounting coupler 910 may be provided to secure one or more components of the assembly 900 together. The coupler 910 may pass through a central aperture of the secondary PCB 908, through a central aperture at the upper portion 914 of the housing main body 902, through a central aperture in the primary PCB 904, and through a central aperture of the base member 906. The mounting coupler 910 may have one end with a threaded portion and a second end with a head wider than the length of the coupler 910. With the length of the mounting coupler 910 extending through the other components of the assembly 900, the threaded portion may be threadably attached to a corresponding threaded portion of an aperture or bolt to secure the assembly 900 together.

Figure 10:
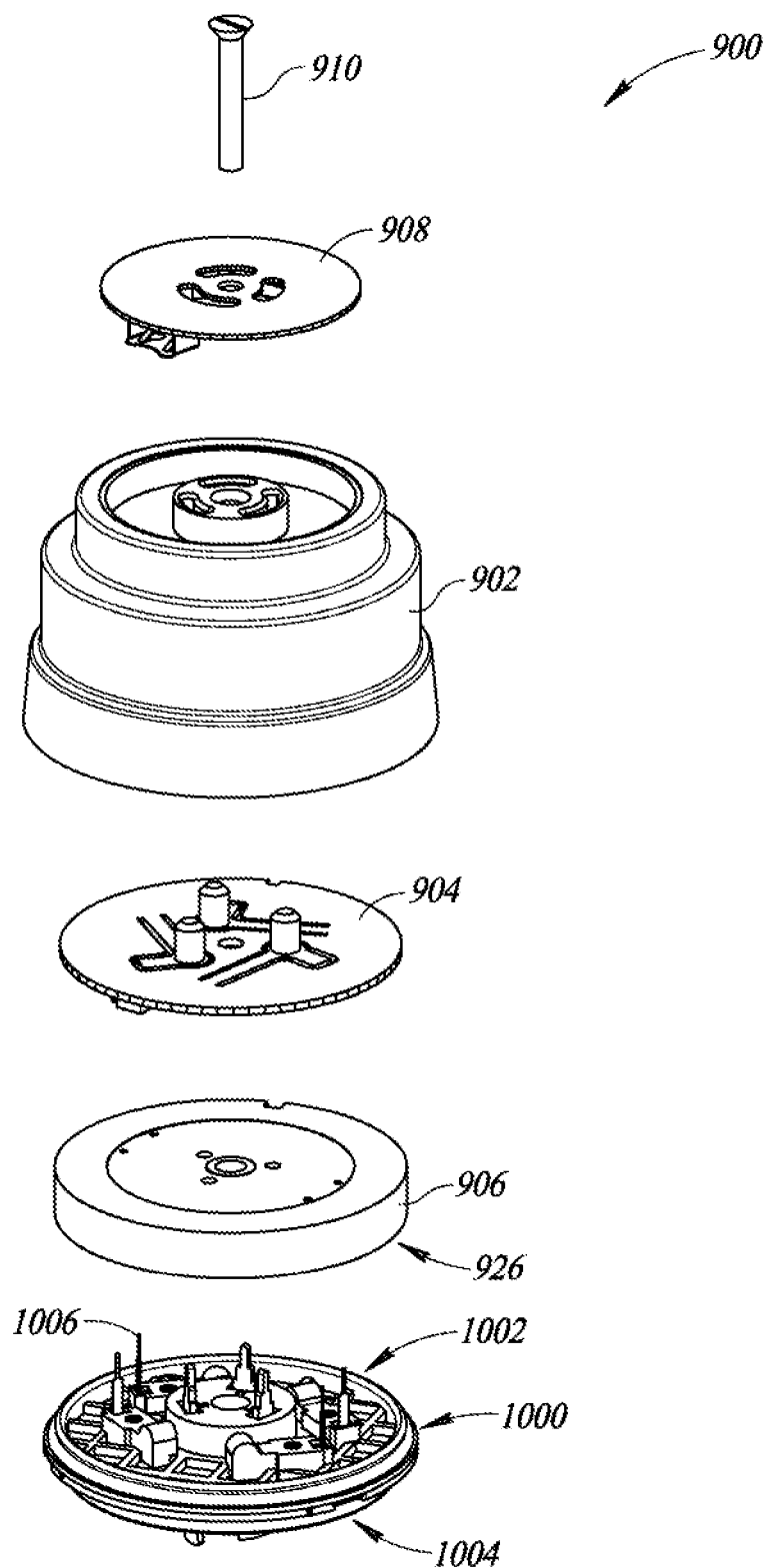
FIG. 10 is a partially exploded view of the assembly of FIG. 9 provided with a twist-lock plug at a second side according to one or more non-limiting embodiments.

FIG. 10 shows the assembly 900 of the protection apparatus 200 provided with a twist-lock plug 1000. The plug 1000 may be secured at or onto a bottom surface 926 of the base member 906, or may serve as the base member in some embodiments. A set of electrical contacts on a second side 1004 of the plug 1000 provide outputs from the protection apparatus 200 and/or the control subsystem 102. For instance, one or more electrical contacts may correspond to the output node 528 for providing mains power to the light sources 120 as a result of the electromechanical switch 508 and the switching circuit 502 being in a closed state. One or more electrical contacts may also be provided on a first side 1002 of the plug 1000 opposite to the second side 1004. At least some of the one or more electrical contacts on the first side 1002 may correspond to electrical contacts on the second side 1004. The second side 1004 of the plug 1000 may include one or more posts 1006 extending outwardly therefrom. The posts 1006 may be arranged to correspond to apertures or recesses in the base member 906 and/or the primary PCB 904 to ensure that the plug 1000 is properly oriented relative to the base member 906 and/or the primary PCB 904. The posts 1006 may include electrical contacts that interface with electrical contact portions of the primary PCB 904 and/or the secondary PCB 908.

Figure 11:
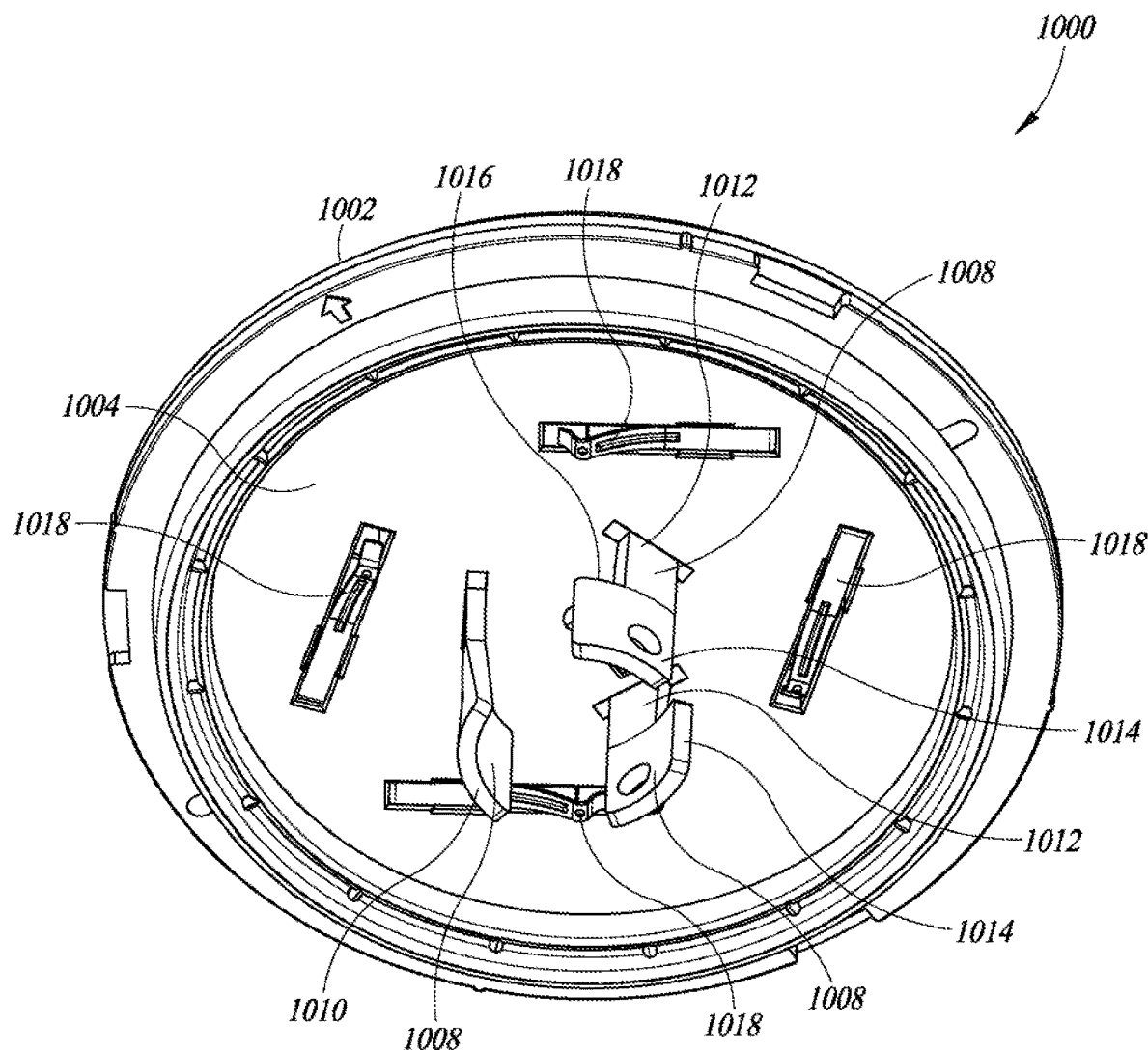
FIG. 11 is a perspective view of the twist-lock plug of FIG. 10 according to one or more non-limiting embodiments.

As shown in FIG. 11, a second surface of the twist-lock plug 1000 includes a set of male electrical contacts 1008 extending outwardly therefrom. The male electrical contacts 702 may include a proximal part 1010 and a distal part 1012 in which the proximal part 1010 is located relatively closer to the second surface 1004, and the distal part 1012 is located relatively away from the second surface 1004. The proximal part 1010 may extend perpendicularly out from the second surface 1004 of the twist-lock plug 1000. In some implementations, the distal part 1012 may include an offset portion 1014 that is offset from the proximal part 1010 of the male electrical contact 1008. The offset portion 1014 may include an edge 1016 that extends parallel to the second surface 1004 of the twist-lock plug 1000. When the male electrical contacts 1008 are inserted into corresponding female electrical receptacles and twisted, the edge 1016 of the offset portion 1014 of the male electrical contacts 1008 may engage with the corresponding edge or lip of the female electrical receptacle to thereby securely engage and physically couple the twist-lock plug 1000 with the mounting base of a corresponding twist-lock connector of an associated device, such as the lighting subsystem 104.

In some implementations, the twist-lock plug 1000 may include one or more electrical connectors 1018 that may be used to electrically couple with the electrical contact pads 927 on the secondary PCB 908. Such electrical connectors 1018 and corresponding electrical contact pads of the secondary PCB 908 may be used for a five or seven pin NEMA photo-control twist-lock socket, respectively, that may provide low voltage control of the controllable device. For example, many luminaires have 0 to 10 volt dimming control, where the low voltage signal sets the brightness of the luminaire. Digital Addressable Lighting Interface (DALI) control may include two low voltage control lines, which may be connected via two sets of the electrical connectors 1018 and corresponding electrical contact pads of the second PCB 908.

In some implementations, the twist-lock plug 1000 may provide photo-control for a luminaire or lighting subsystem 104 when engaged and electrically coupled with a corresponding twist-lock connector thereof. In such an implementation, the mounting coupler 910 in the twist-lock connector may be loosened, allowing for the rotation of the remaining components of the twist-lock connector. The posts 1006 engage in recesses or apertures of the base member 906 and/or the primary PCB 904 to keep the primary PCB 106 and/or base member 906 aligned during rotation. The mounting coupler 910 may then be tightened to clamp together the components of the assembly 900, thereby maintaining its proper position relative to the other components of the assembly 900. The twist-lock plug 1000 may then be engaged with and installed in the assembly 900. Such a rotatable feature may be advantageous in installations where there may be other light sources or light reflectors (such as tree branches) which may cause undesirable operation of the photo-control if not oriented in a particular direction.

Figure 12:
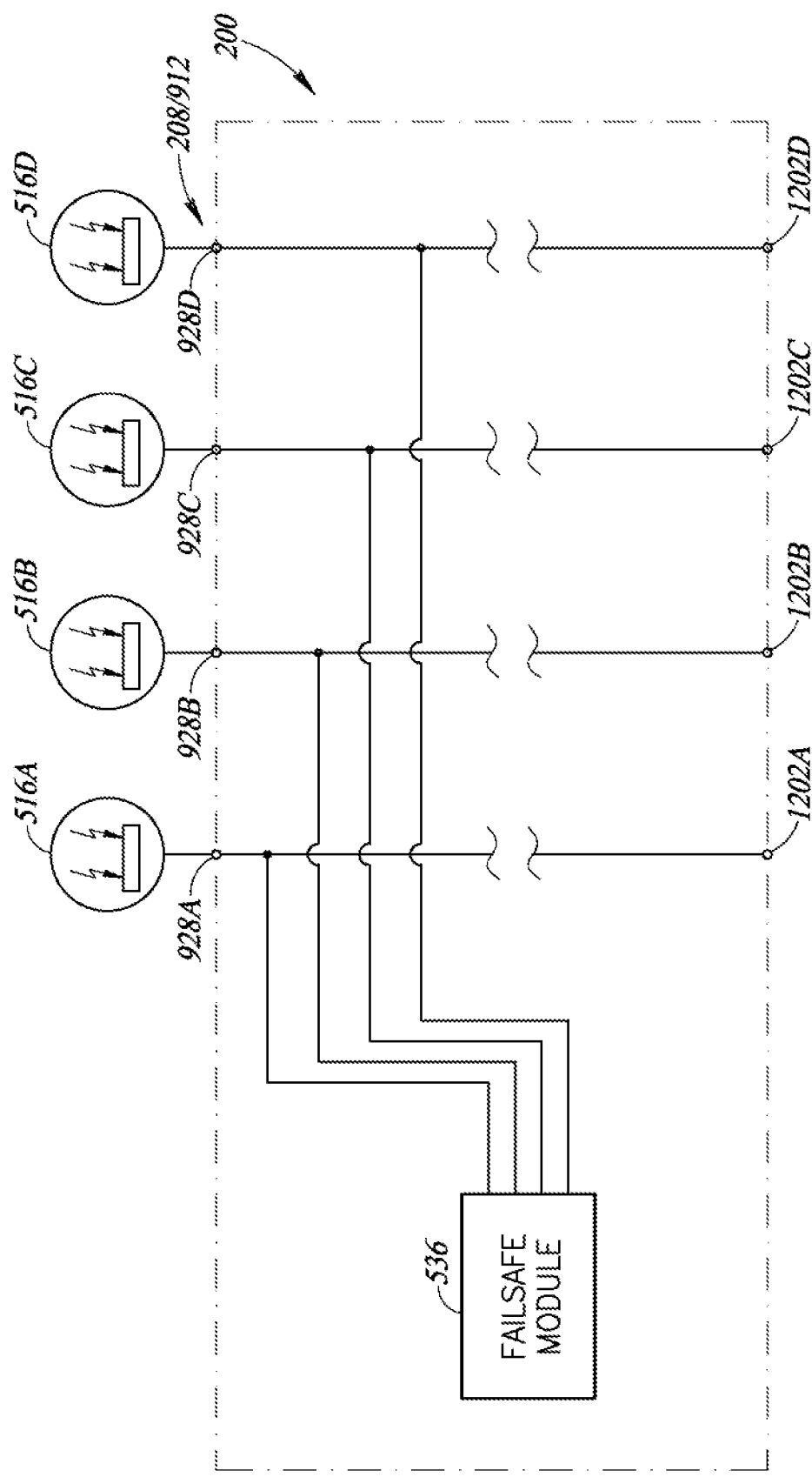
FIG. 12 is a schematic diagram of the failsafe module of the protection apparatus electrically coupled to one or more photo-control elements of the control subsystem according to one or more non-limiting embodiments.

FIG. 12 shows an electrical schematic diagram of one or more photo-control components 516 of a control subsystem 102 attached to the protection apparatus 200 via electrical contacts 928 that may be implemented as electrical contact pads 927 on the first surface 922 of the secondary PCB 908. The one or more photo-control components 516 of the control subsystem 102 are provided for detecting an ambient light level and controlling illumination of the luminaire or lighting subsystem 104 attached thereto based on the ambient light level detected. In the implementation depicted in FIG. 12, control nodes 1202 of the twist-lock plug 1000 are communicably coupled with the electrical contacts 928 of the second connector 208 to provide illumination control of light sources 120 of an attached illumination subsystem 104. The coupling between the contacts 928 and the control nodes 1202 may be direct connections without any intervening electrical or electronic components, or may be an indirect connection with intervening electrical or electronic components. Individual ones of control nodes 1202 may be electrically coupled to corresponding ones of the electrical connectors 1018 of the twist-lock plug 1000.

The failsafe module 536 may be connected to the electrical contacts 928 and obtain measurements of an ambient light level detected by the one or more photo-control elements 516. Each of the electrical contacts 928 correspond to light levels (e.g., intensity) of ambient light detected by the one or more photo-control elements 516. Signals provided by the photo-control elements 516A through 516D may be used to control characteristics of the light sources 120. For instance, a light source driver may cause the light sources 120 to illuminate at a certain brightness based on the level of ambient light detected by the photo-control elements 516. The failsafe module 536 may receive signals corresponding to ambient light level and determine a status of the control subsystem 102 based at least in part on the signals received.

In some implementations, the failsafe module 536 may determine a status of the electromechanical switch 508 based at least in part on the signals received at the electrical contacts 928. The non-transitory storage 804 of the failsafe module 536 may store information from which a predicted state of the electromechanical switch 508 may be determined based on the signals received at the electrical contacts 928. For instance, the information may indicate that the electromechanical switch 508 should be in an open state or a closed state based on the signals received. The failsafe module 536 may obtain switch state information from the detection module 504 and compare that information with the predicted state of the switch 508. Based at least in part on a result of the comparison, the failsafe module 536 may determine the status of the switch 508—for example, determining that the switch 508 is operating properly or not operating properly. The failsafe module 536 may control a state of the switching circuitry 502 and/or other aspects of the protection apparatus 200 (e.g., bypass circuitry) based on the status determined.

In some implementations, the failsafe module 536 may determine a status of the photo-control elements 516 based at least in part on the signals received at the electrical contacts 928. The failsafe module may determine a predicted values or ranges of values to be produced by one or more of the photo-control elements 916 at the electrical contacts 928 based on information stored by the non-transitory storage 804 and/or received from the GPS receiver 806, the RTC 808, the timer circuit 816, or the communication interface 810. For instance, the failsafe module 536 may determine a predicted value or range of values for the signals received based on the time or occurrence of solar events calculated using geolocation, time, or date data either generated by or stored within the protection apparatus 200 or obtained from one or more external devices via one or more wired or wireless communication interfaces either in or communicably coupled to the protection apparatus 200. The failsafe module 536 may further determine the predicted value or range of values based on local geographic, meteorological, atmospheric or temporal data that is either determined by the failsafe module 536, stored within the non-transitory storage media 804, provided by an external source such as a network connection to the communications interface 810, or some combination thereof. The predicted values or ranges of values may include average values, maximum values, minimum values, and values generated based on statistical functions (e.g., standard deviation).

The failsafe module 536 may compare the predicted values or ranges of values with the signals received from the photo-control elements 516 and determine a status of the control subsystem 102 based on a result of the comparison. The failsafe module 536 may determine that the photo-control elements 516 are operating properly as a result of the signals received corresponding to the predicted values or ranges of values. As a result of determining that one or more of the signals received do not match the predicted values or range of values, the failsafe module 536 may determine that one or more of the photo-control elements 516 are not working properly. The failsafe module 536 may cause one or more operations to be performed as a result of the status determined. In some implementations, the failsafe module 536 may control a state of the switching circuitry 502 based on the result of the status. In some implementations, the failsafe module 536 may control a signal applied to one or more of the control nodes 1202 as a result of determining that one or more of the photo-control elements 516 are operating improperly. For instance, as a result of determining improper photo-control element 516 operation, the failsafe module 536 may include a signal control circuit (not pictured) that applies a particular voltage to one or more of the control nodes 1202 based on the predicted values or range of values determined.

In some implementations in which the failsafe module 536 includes or is coupled with the photosensitive transducer 818, the failsafe module 536 may determine the status of the control subsystem 102 based on information or signals received from the photosensitive transducer 818. For instance, the failsafe module 536 may determine a status of one or more of the photo-control components 516 based on information obtained from the photosensitive transducer 818. If the information or signals obtained from the photosensitive transducer 818 do not match or comport with the signals or information obtained from one or more of the photo-control elements 516, the failsafe module 536 may determine that the photo-control elements 516 are not properly operating. On the other hand, if the information or signals obtained from the photosensitive transducer 818 match or comport with the signals or information obtained from one or more of the photo-control elements 516, the failsafe module 536 may determine that the photo-control elements 516 are properly operating. The failsafe module 536 may cause one or more operations to be performed as a result, such as by updating a state of the switching circuitry 502 and/or sending a transmission via the wireless communication interface 810.

Figure 13:
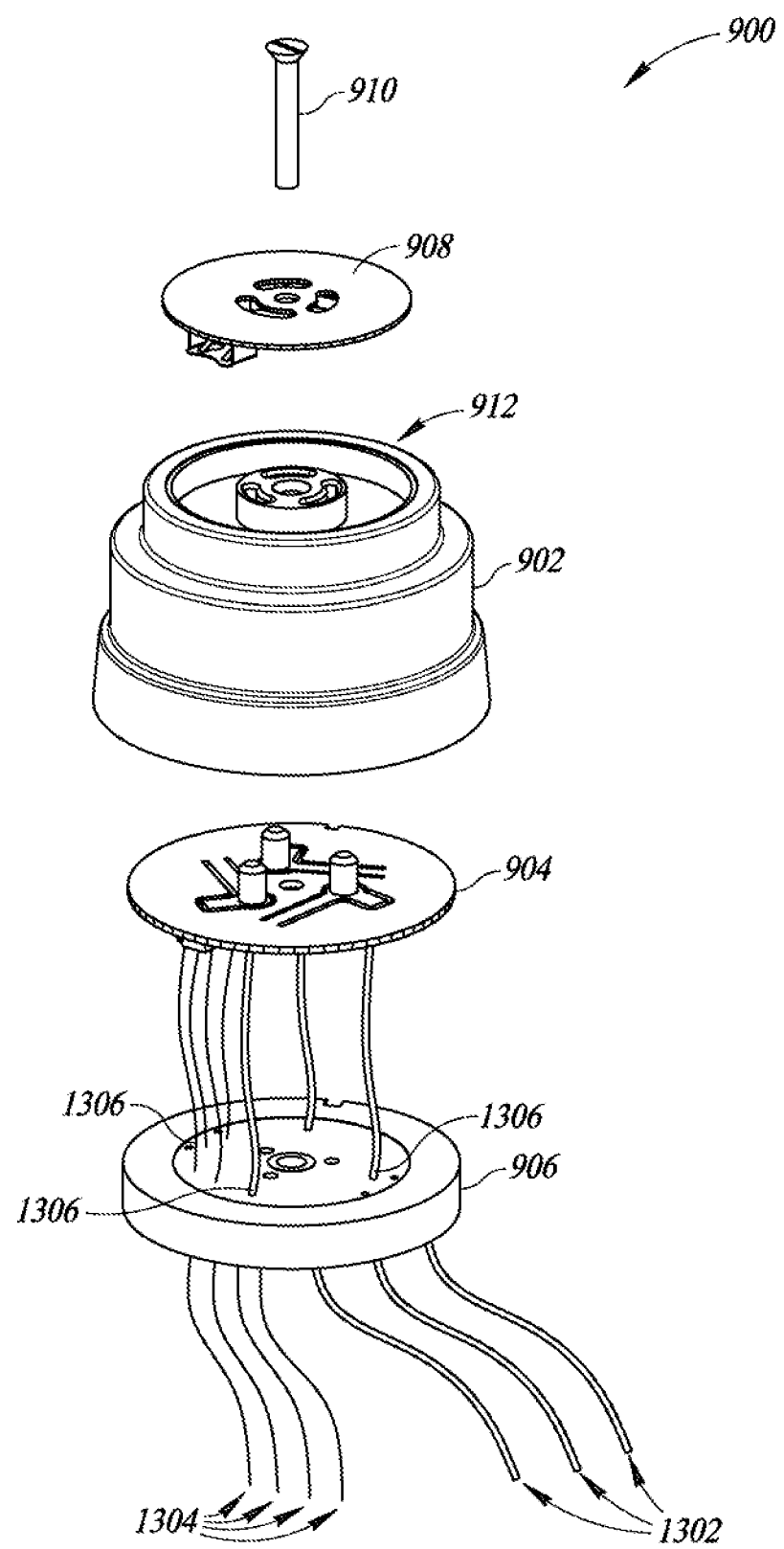
FIG. 13 is a partially exploded view of the assembly of FIG. 9 provided with wire connectors at a second side according to one or more non-limiting embodiments.

The assembly 900 of FIGS. 10 and 11 has twist-lock plug connectors on opposing sides; however, the protection apparatus 200 may have a single twist-lock plug connector in other implementations. FIG. 13 shows an assembly 1300 implementing the protection apparatus 200 including the connector 912 described above with respect to FIG. 9, but which includes one or more sets of wires for connecting to a target subsystem, such as the lighting subsystem 104. In at least some other respects, the assembly 1300 may be substantially similar to the assembly 900. In particular, the assembly 1300 includes the housing main body 902, the primary PCB 904, the base member 906, the secondary PCB 908, and the mounting coupler 910. The one or more sets of wires may include a first set of wires 1302 and a second set of wires 1304. The first set of wires 1302 include a wire corresponding to the first node 518, the second node 520, and the third node 524 described above with respect to FIG. 5, for example. The second set of wires 1304 include individual wires electrically connected to corresponding ones of the control nodes 1202 described above with respect to FIG. 12. The first set of wires 1302 and the second set of wires 1304 may be physically and electrically coupled to the primary PCB 904 or the secondary PCB 908. The first set of wires 1302 and the second set of wires 1304 may pass through apertures 1306 extending through a thickness of the base member 906. The protection apparatus 200 of the assembly 1300 may be electrically coupled to the lighting subsystem 104 by physically and electrically coupling the sets of wires 1302 and 1304 to corresponding nodes of the lighting subsystem 104. As a result, a lighting subsystem 104 not equipped with a twist-lock connector or plug, as described herein, may be provided with a twist-lock connector for enabling photo or remote control of the lighting subsystem 104. Moreover, such a modification enhances the lighting subsystem 104 with the additional features of the protection apparatus 200 described herein.

Figure 14:
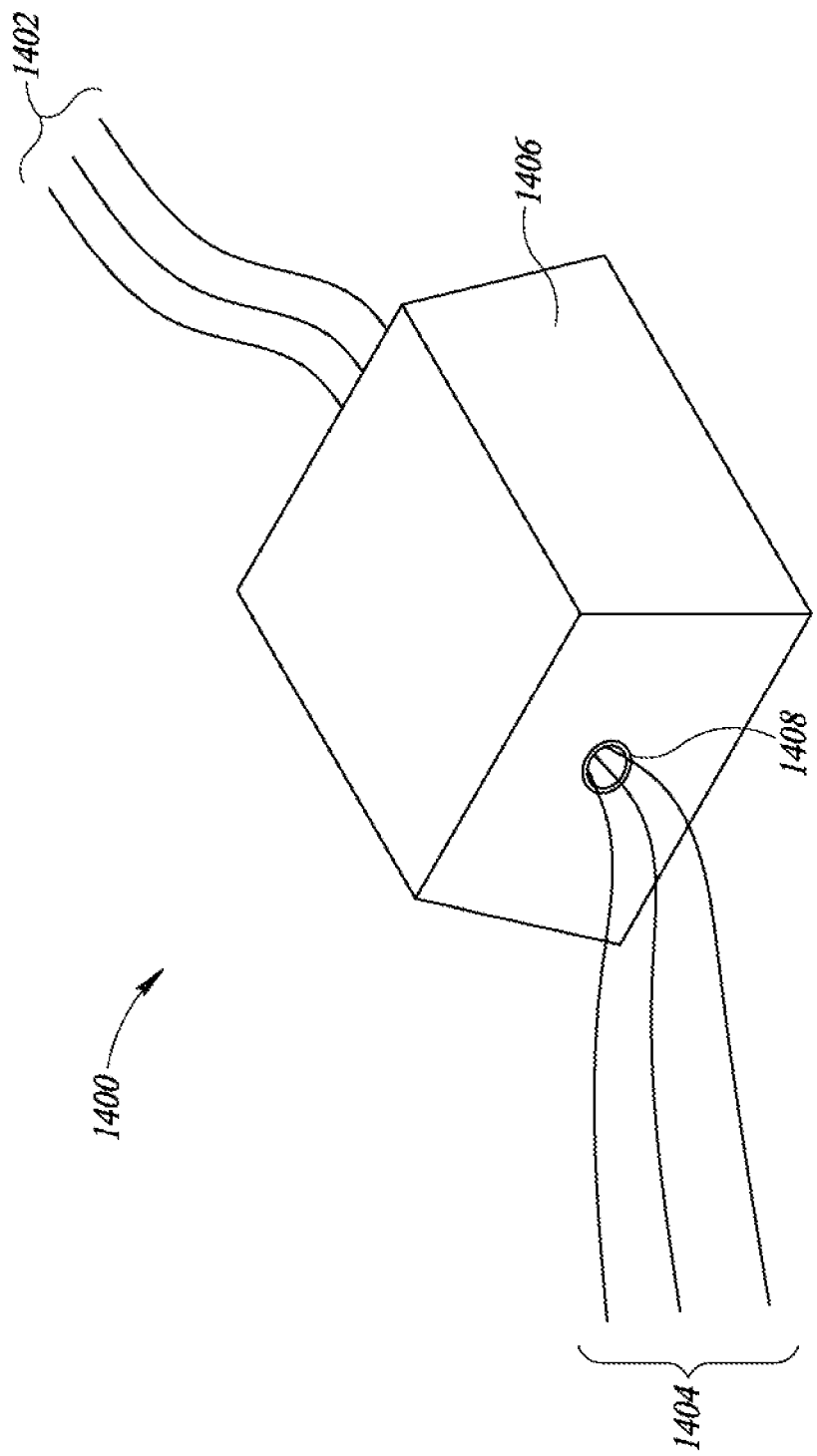
FIG. 14 is a perspective view of a second assembly including the protection apparatus according to one or more non-limiting embodiments.

FIG. 14 shows an assembly 1400 implementing the protection apparatus 200, but which includes one or more sets of wires 1402 for connecting to a target subsystem, such as the lighting subsystem 104, and one or more sets of wires 1404 for connecting to the control subsystem 102. The wires of the sets of wires 1402 and 1404 may correspond to the connector elements described herein. The assembly 1400 may include a housing 1406 with one or more apertures 1408 through which wires may extend to connect to one or more PCBs within the housing 1406. A weatherproof seal may be disposed on or around one or more of the apertures 1408 to protect the protection apparatus 200 from moisture and corrosion.

Figure 15A:
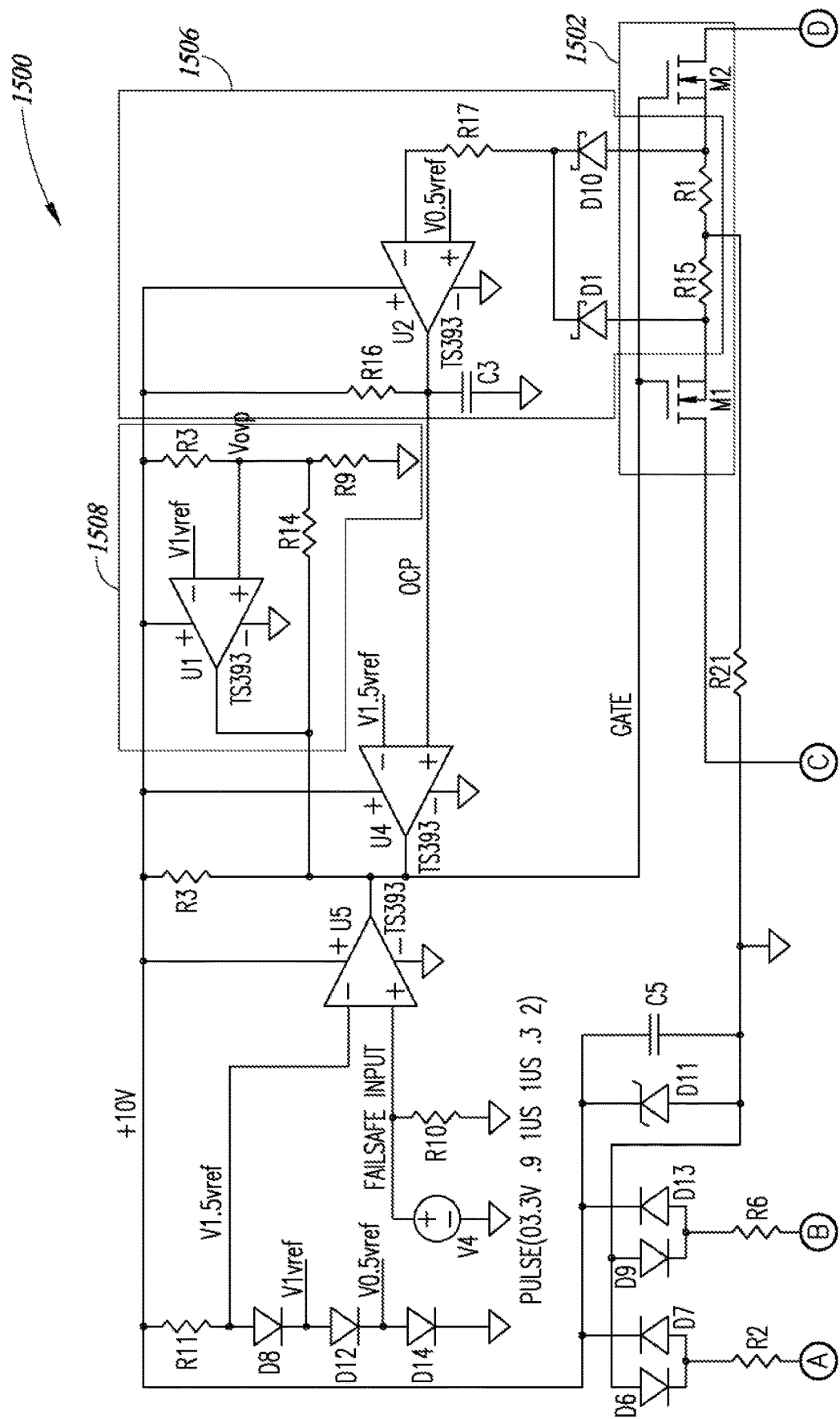
FIGS. 15A and 15B are schematic diagrams of the protection apparatus according to one or more non-limiting embodiments.
Figure 15B:
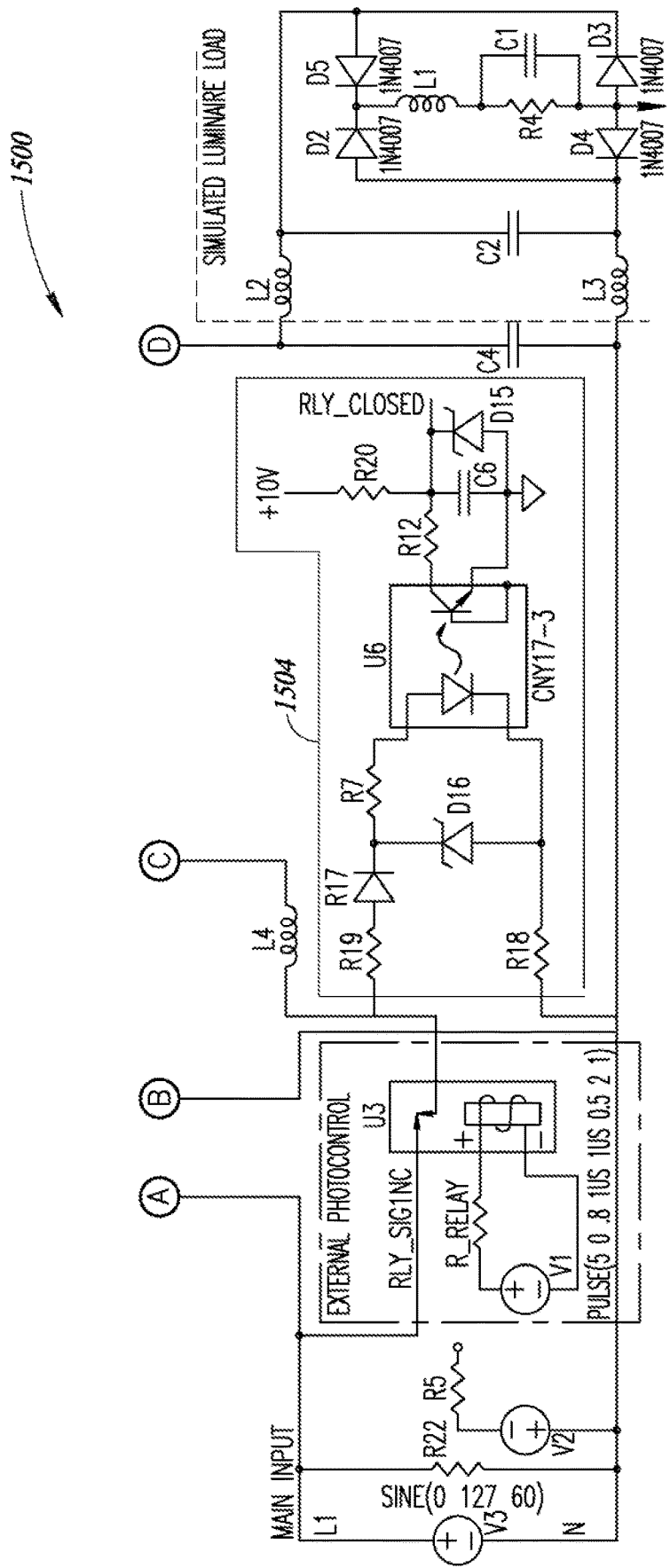

FIGS. 15A and 15B are schematic diagrams of circuits 1500 of the protection apparatus 200. The circuits 1500 of the protection apparatus 200 includes a bidirectional AC switching circuit 1502 and a relay detection circuit 1504.

The circuits 1500 may include other protection circuitry, as described above, such as a short circuit protection circuit 1506 and an undervoltage protection circuit 1508. The bidirectional AC switching circuit 1502 includes a pair of MOSFET power transistors connected in series for providing bi-directional AC power to the load. The relay detection circuit 1504 is voltage detection circuitry that detects whether voltage is applied to the AC switching circuit 1502 via an electromechanical switch of the control subsystem 102 being in a closed state.

The relay detection circuit 1504 depicted includes high impedance resistors connected to inputs thereof, and a Zener diode in parallel to an optical isolator (e.g., opto-coupler). As a result of a threshold voltage being applied to the inputs of the relay detection circuit 1504, the optical isolator causes a transistor on an output side to begin conducting, thereby causing the relay detection circuit 1504 to output a signal indicating the state of the relay. For instance, the detection circuit 1504 may output a signal having a first voltage (e.g., <1V) if a voltage exceeding a threshold level is detected at the input of the relay detection circuit. On the other hand, the output of the detection circuit 1504 may provide a signal having a second voltage (e.g., >1V) if a voltage less than or equal to the threshold level is detected. The relay state output of the relay detection circuit 1504 is provided to one or more other circuits of the protection apparatus 200, such as the failsafe module 536 and/or timer circuitry 706 for causing a defined time delay.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to: U.S. patent application 62/669,883 filed May 10, 2018; U.S. Provisional Patent Application No. 61/052,924, filed May 13, 2008; U.S. Pat. No. 8,926,138, issued Jan. 6, 2015; PCT Publication No. WO2009/140141, published Nov. 19, 2009; U.S. Provisional Patent Application No. 61/051,619, filed May 8, 2008; U.S. Pat. No. 8,118,456, issued Feb. 21, 2012; PCT Publication No. WO2009/137696, published Nov. 12, 2009; U.S. Provisional Patent Application No. 61/088,651, filed Aug. 13, 2008; U.S. Pat. No. 8,334,640, issued Dec. 18, 2012; U.S. Provisional Patent Application No. 61/115,438, filed Nov. 17, 2008; U.S. Provisional Patent Application No. 61/154,619, filed Feb. 23, 2009; U.S. Patent Publication No. 2010/0123403, published May 20, 2010; U.S. Patent Publication No. 2016/0021713, published Jan. 21, 2016; PCT Publication No. WO2010/057115, published May 20, 2010; U.S. Provisional Patent Application No. 61/174,913, filed May 1, 2009; U.S. Pat. No. 8,926,139, issued Jan. 6, 2015; PCT Publication No. WO2010/127138, published Nov. 4, 2010; U.S. Provisional Patent Application No. 61/180,017, filed May 20, 2009; U.S. Pat. No. 8,872,964, issued Oct. 28, 2014; U.S. Patent Publication No. 2015/0015716, published Jan. 15, 2015; PCT Publication No. WO2010/135575, published Nov. 25, 2010; U.S. Provisional Patent Application No. 61/229,435, filed Jul. 29, 2009; U.S. Patent Publication No. 2011/0026264, published Feb. 3, 2011; U.S. Provisional Patent Application No. 61/295,519, filed Jan. 15, 2010; U.S. Provisional Patent Application No. 61/406,490, filed Oct. 25, 2010; U.S. Pat. No. 8,378,563, issued Feb. 19, 2013; PCT Publication No. WO2011/088363, published Jul. 21, 2011; U.S. Provisional Patent Application No. 61/333,983, filed May 12, 2010; U.S. Pat. No. 8,541,950, issued Sep. 24, 2013; PCT Publication No. WO2010/135577, published Nov. 25, 2010; U.S. Provisional Patent Application No. 61/346,263, filed May 19, 2010; U.S. Pat. No. 8,508,137, issued Aug. 13, 2013; U.S. Pat. No. 8,810,138, issued Aug. 19, 2014; U.S. Pat. No. 8,987,992, issued Mar. 24, 2015; PCT Publication No. WO2010/135582, published Nov. 25, 2010; U.S. Provisional Patent Application No. 61/357,421, filed Jun. 22, 2010; U.S. Pat. No. 9,241,401, granted Jan. 19, 2016; PCT Publication No. WO2011/163334, published Dec. 29, 2011; U.S. Pat. No. 8,901,825, issued Dec. 2, 2014; U.S. Patent Publication No. 2015/0084520, published Mar. 26, 2015; PCT Publication No. WO2012/142115, published Oct. 18, 2012; U.S. Pat. No. 8,610,358, issued Dec. 17, 2013; U.S. Provisional Patent Application No. 61/527,029, filed Aug. 24, 2011; U.S. Pat. No. 8,629,621, issued Jan. 14, 2014; PCT Publication No. WO2013/028834, published Feb. 28, 2013; U.S. Provisional Patent Application No. 61/534,722, filed Sep. 14, 2011; U.S. Pat. No. 9,312,451, issued Apr. 12, 2016; PCT Publication No. WO2013/040333, published Mar. 21, 2013; U.S. Provisional Patent Application No. 61/567,308, filed Dec. 6, 2011; U.S. Pat. No. 9,360,198, issued Jun. 7, 2016; U.S. Provisional Patent Application No. 61/561,616, filed Nov. 18, 2011; U.S. Patent Publication No. 2013/0141010, published Jun. 6, 2013; PCT Publication No. WO2013/074900, published May 23, 2013; U.S. Provisional Patent Application No. 61/641,781, filed May 2, 2012; U.S. Patent Publication No. 2013/0293112, published Nov. 7, 2013; U.S. Patent Publication No. 2013/0229518, published Sep. 5, 2013; U.S. Provisional Patent Application No. 61/640,963, filed May 1, 2012; U.S. Patent Publication No. 2013/0313982, published Nov. 28, 2013; U.S. Patent Publication No. 2014/0028198, published Jan. 30, 2014; U.S. Pat. No. 9,801,248, issued Oct. 24, 2017; PCT Publication No. WO2014/018773, published Jan. 30, 2014; U.S. Provisional Patent Application No. 61/723,675, filed Nov. 7, 2012; U.S. Pat. No. 9,301,365, issued Mar. 29, 2016; U.S. Provisional Patent Application No. 61/692,619, filed Aug. 23, 2012; U.S. Patent Publication No. 2014/0055990, published Feb. 27, 2014; U.S. Provisional Patent Application No. 61/694,159, filed Aug. 28, 2012; U.S. Pat. No. 8,878,440, issued Nov. 4, 2014; U.S. Patent Publication No. 2014/0062341, published Mar. 6, 2014; U.S. Patent Publication No. 2015/0077019, published Mar. 19, 2015; PCT Publication No. WO2014/039683, published Mar. 13, 2014; U.S. Provisional Patent Application No. 61/728,150, filed Nov. 19, 2012; U.S. Patent Publication No. 2014/0139116, published May 22, 2014; U.S. Pat. No. 9,433,062, issued Aug. 30, 2016; PCT Publication No. WO2014/078854, published May 22, 2014; U.S. Provisional Patent Application No. 61/764,395, filed Feb. 13, 2013; U.S. Pat. No. 9,288,873, issued Mar. 15, 2016; U.S. Provisional Patent Application No. 61/849,841, filed Jul. 24, 2013; U.S. Patent Publication No. 2015/0028693, published Jan. 29, 2015; PCT Publication No. WO2015/013437, published Jan. 29, 2015; U.S. Provisional Patent Application No. 61/878,425, filed Sep. 16, 2013; U.S. Patent Publication No. 2015/0078005, published Mar. 19, 2015; PCT Publication No. WO2015/039120, published Mar. 19, 2015; U.S. Provisional Patent Application No. 61/933,733, filed Jan. 30, 2014; U.S. Pat. No. 9,185,777, issued Nov. 10, 2015; PCT Publication No. WO2015/116812, published Aug. 6, 2015; U.S. Provisional Patent Application No. 61/905,699, filed Nov. 18, 2013; U.S. Pat. No. 9,414,449, issued Aug. 9, 2016; U.S. Pat. No. 9,781,797, issued Oct. 3, 2017; U.S. Provisional Patent Application No. 62/068,517, filed Oct. 24, 2014; U.S. Provisional Patent Application No. 62/183,505, filed Jun. 23, 2015; U.S. Pat. No. 9,445,485, issued Sep. 13, 2016; PCT Publication No. WO2016/064542, published Apr. 28, 2016; U.S. Provisional Patent Application No. 62/082,463, filed Nov. 20, 2014; U.S. Publication No. 2016/0150369, published May 26, 2016; PCT Publication No. WO2016/081071, published May 26, 2016; U.S. Provisional Patent Application No. 62/057,419, filed Sep. 30, 2014; U.S. Publication No. 2016/0095186, published Mar. 31, 2016; PCT Publication No. WO2016/054085, published Apr. 7, 2016; U.S. Provisional Patent Application No. 62/114,826, filed Feb. 11, 2015; U.S. Non-provisional patent application Ser. No. 14/939,856, filed Nov. 12, 2015; U.S. Provisional Patent Application No. 62/137,666, filed Mar. 24, 2015; U.S. Non-provisional patent application Ser. No. 14/994,569, filed Jan. 13, 2016; U.S. Non-provisional patent application Ser. No. 14/844,944, filed Sep. 3, 2015; U.S. Provisional Patent Application No. 62/208,403, filed Aug. 21, 2015; U.S. Non-provisional patent application Ser. No. 15/238,129, filed Aug. 16, 2016; U.S. Provisional Patent Application No. 62/264,694, filed Dec. 8, 2015; U.S. Non-provisional patent application Ser. No. 15/369,559, filed Dec. 5, 2016; U.S. Provisional Patent Application No. 62/397,709, filed Sep. 21, 2016; U.S. Non-provisional patent application Ser. No. 15/709,022, filed Sep. 19, 2017; U.S. Provisional Patent Application No. 62/397,713, filed Sep. 21, 2016; U.S. Non-provisional patent application Ser. No. 15/709,028, filed Sep. 19, 2017; U.S. Provisional Patent Application No. 62/327,939, filed Apr. 26, 2016; U.S. Non-provisional patent application Ser. No. 15/496,985, filed Apr. 25, 2017; U.S. Provisional Patent Application No. 62/379,037, filed Aug. 24, 2016; U.S. Non-provisional patent application Ser. No. 15/681,927, filed Aug. 21, 2017; U.S. Provisional Patent Application No. 62/458,970, filed Feb. 14, 2017; U.S. Non-provisional patent application Ser. No. 15/895,439, filed Feb. 13, 2018; U.S. Provisional Patent Application No. 62/480,833, filed Apr. 3, 2017; U.S. Non-provisional patent application Ser. No. 15/943,183, Apr. 2, 2018; U.S. Provisional Patent Application No. 62/507,730, filed May 17, 2017; U.S. Non-provisional patent application Ser. No. 15/980,978, filed May 16, 2018; U.S. Non-provisional patent application Ser. No. 15/799,744, filed Oct. 31, 2017; and U.S. Provisional Patent Application No. 62/669,883, filed May 10, 2018, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A protection apparatus selectively attachable to a control apparatus and a device to be at least partially controlled by the control apparatus, the control apparatus having a connector with a set of electrical contacts and at least one switch, the device having a set of nodes, the protection apparatus comprising:
  a housing;
  a first connector accessible from an exterior of the housing, the first connector including a first set of electrical contacts that interface with corresponding ones of the set of electrical contacts of the connector of the control apparatus;
  a second connector accessible from the exterior of the housing, the second connector including a second set of electrical contacts that interface the protection apparatus with corresponding ones of the set of nodes of the device to be at least partially controlled by the control apparatus; and
  circuitry included on one or more printed circuit boards contained within the housing, the circuitry electrically coupled to one or more of the first set of electrical contacts and one or more of the second set of electrical contacts, wherein the circuitry:
    selectively switches between a first state and a second state, the first state in which a closed circuit is established between a first electrical contact of the first set of electrical contacts and a node of the protection apparatus electrically coupled to at least one of the second set of electrical contacts, and the second state in which an open circuit is established between the first electrical contact of the first set of electrical contacts and the node,
    detects a transition of one or more of the at least one switch of the control apparatus from a third state in which the one or more of the at least one switch is open to a fourth state in which the one or more of the at least one switch is closed,
    transitions between the first state and the second state in response to a determination that the one or more of the at least one switch is in a steady state after detection of the transition of the one or more of the at least one switch from the third state to the fourth state; and
    determines a set of states of the one or more of the at least one switch over a period of time and further determines a status of the control apparatus based at least in part on a number of switching events of the one or more of the at least one switch over the period of time.

2. The protection apparatus of claim 1 wherein the determination that the one or more of the at least one switch is in the steady state includes a determination that a defined period of time has elapsed since the detection of the transition of the one or more of the at least one switch.

3. The protection apparatus of claim 1 wherein the second connector is a twist-lock plug and the second set of electrical contacts are male connector contacts.

4. The protection apparatus of claim 1 wherein the second set of electrical contacts of the second connector include a set of wires to establish electrical connections with the corresponding nodes of the device to be at least partially controlled by the control apparatus.

5. The protection apparatus of claim 1 wherein the circuitry includes a bi-directional alternating current switch comprising one or more solid state switches, and the bi-directional alternating current switch switches between the first state and the second state.

6. The protection apparatus of claim 1 wherein the circuitry includes a triode for alternating current, and the triode switches between the first state and the second state.

7. The protection apparatus of claim 1 wherein the circuitry includes inrush current limiting circuitry electrically coupled between an input terminal of the circuitry and an output terminal of the circuitry, the inrush current limiting circuitry providing a constraint on an inrush of current to the first connector element caused by a transition of the circuitry between the first state and the second state.

8. The protection apparatus of claim 1 wherein the first connector is a twist-lock receptacle that includes female receptacles for receiving corresponding male connector contacts of the connector of the control apparatus.

9. The protection apparatus of claim 1 wherein the circuitry has a normal mode in which selective provisioning of power received at the second connector is controlled by the control apparatus and a failure detection mode in which selective provisioning of the power received at the second connector is controlled by the circuitry of the protection apparatus.

10. The protection apparatus of claim 9 wherein the circuitry transitions between the normal mode and the failure detection mode based at least in part on the status of the control apparatus.

11. The protection apparatus of claim 1, further comprising:
a communication interface to communicate the status of the control apparatus to one or more devices external to the protection apparatus.

12. The protection apparatus of claim 1, wherein the status of the control apparatus is determined based at least in part on location information indicating a location of the protection apparatus.

13. The protection apparatus of claim 1, wherein the status of the control apparatus is determined based at least in part on meteorological or atmospheric data regarding conditions local to the protection apparatus.

14. The protection apparatus of claim 1, further comprising:
a photosensor electrically coupled to the circuitry, wherein the status of the control apparatus is determined based at least in part on one or more measurements obtained from the photosensor during the period of time.

15. The protection apparatus of claim 1 wherein the first connector includes a third set of electrical contacts for interfacing with a second set of corresponding electrical contacts of the control apparatus.

16. The protection apparatus of claim 15 wherein the second connector includes a fourth set of electrical contacts, and the third set of electrical contacts are electrically coupled to the fourth set of electrical contacts.

17. The protection apparatus of claim 1, wherein the housing has a cylindrical shape, the first connector located on a first side of the housing, and the second connector located on a second side of the housing opposite to the first side.

18. The protection apparatus of claim 1, wherein the housing is sized and shaped to be at least partially positioned within the device to be at least partially controlled by the control apparatus.

19. A system, comprising:
a lighting subsystem including one or more light sources;
a control subsystem having an electromechanical switch that transitions between an open state and a closed state;
a protection apparatus connecting the lighting subsystem with the control subsystem, the protection apparatus including:
a housing positioned in between the lighting subsystem and the control sub system;
a first connection with a set of electrical contacts of the control subsystem;
a second connection with a set of electrical contacts of the lighting subsystem, and
one or more printed circuit boards installed within the housing and including circuitry that:
detects a switching event of the electromechanical switch of the control subsystem from the open state to the closed state, and
selectively switches, in response to determining that the electromechanical switch is in a steady state after detection of detecting the switching event, from a first state in which an open circuit is established between the one or more light sources and the electromechanical switch and a second state in which a closed circuit is established between the one or more light sources and the electromechanical switch; and
a communication interface to communicate with one or more devices external to the protection apparatus, wherein the circuitry has a normal mode in which selective provisioning of power received at the second connection is controlled by the control subsystem and a failure detection mode in which selective provisioning of the power received at the second connection is controlled by the circuitry that operates in the normal mode or the failure detection mode based at least in part on a communication received by the communication interface.

20. The system of claim 19, wherein mains power is connected to the system, the mains power is not supplied to the one or more light sources in the first state, and the mains power is supplied to the one or more light sources in the second state.

21. The system of claim 20, wherein the protection apparatus is removably attachable with at least one of the control subsystem and the lighting subsystem.

22. A method of protecting an electromechanical switch of a control apparatus removably attached to a protection apparatus, the method comprising:
detecting a transition of the electromechanical switch from a first state in which the electromechanical switch is open to a second state in which the electromechanical switch is closed;
in response to detecting the transition, causing a time delay of a defined period of time to elapse; and
as a result of determining that the defined period of time has elapsed since detecting the transition, causing an alternating current switch to establish a closed circuit from one electrical contact of the protection apparatus, through the electromechanical switch, and to a second electrical contact of the protection apparatus and
determining a set of states of the electromechanical switch over a period of time and further determining a status of the control apparatus based at least in part on a number of switching events of the electromechanical switch over the period of time.

23. The method of claim 22, wherein the protection apparatus is connected to a device to be controlled by the control apparatus, mains power is supplied to the device as a result of the closed circuit being established, and the mains power is not supplied to the device as a result of the open circuit being established.

* * * * *